US012633256B2

(12) United States Patent
Cho et al.

(10) Patent No.: US 12,633,256 B2
(45) Date of Patent: May 19, 2026

(54) ELECTRONIC DEVICE AND METHOD FOR TRANSMISSION TO DISPLAY DRIVING CIRCUIT

(71) Applicant: Samsung Electronics Co., Ltd., Suwon-si (KR)

(72) Inventors: Donghyeon Cho, Suwon-si (KR); Jongkon Bae, Suwon-si (KR); Gyudong Eom, Suwon-si (KR); Jaesung Lee, Suwon-si (KR); Joongyu Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/091,442

(22) Filed: Mar. 26, 2025

(65) Prior Publication Data

US 2025/0225926 A1 Jul. 10, 2025

Related U.S. Application Data

(63) Continuation of application No. PCT/KR2023/014714, filed on Sep. 25, 2023.

(30) Foreign Application Priority Data

Sep. 30, 2022 (KR) ........................ 10-2022-0125366
Dec. 8, 2022 (KR) ........................ 10-2022-0171011

(51) Int. Cl.
*G09G 3/00* (2006.01)
*G09G 3/3208* (2016.01)

(52) U.S. Cl.
CPC ....... *G09G 3/3208* (2013.01); *G09G 2310/08* (2013.01); *G09G 2320/0257* (2013.01);
(Continued)

(58) Field of Classification Search
CPC ........... G06V 10/761; G09G 2320/103; G09G 2330/021; G09G 2340/0435;
(Continued)

(56) References Cited

U.S. PATENT DOCUMENTS 9,524,694 B2 12/2016 Wang et al.
9,653,029 B2 5/2017 Wang et al.
(Continued)

FOREIGN PATENT DOCUMENTS

CN 113870812 A 12/2021
KR 20150007948 A 1/2015
(Continued)

OTHER PUBLICATIONS

International Search Report for PCT/KR2023/014714 mailed Jan. 11, 2024, 5 pages with English translation.
(Continued)

*Primary Examiner* — Insa Sadio
(74) *Attorney, Agent, or Firm* — Nixon & Vanderhye, P.C.

(57) ABSTRACT

An example electronic device may include a processor; a display driving circuit; and a display panel. The processor may be configured to identify, in response to acquiring a second image following a first image displayed on the display panel, the time length between a first timing at which transmission of the first image to the display driving circuit started for the display of the first image, and a second timing which is the start timing of a time period corresponding to a refresh rate for the second image; display the second image on the display panel using the display driving circuit by executing multiple transmissions of the second image to the display driving circuit within the time period from the second timing, based on the time length that is longer than or equal to a reference length; and display the second image
(Continued)

on the display panel using the display driving circuit by executing a single transmission of the second image to the display driving circuit within the time period from the second timing, based on the time length that is shorter than the reference length.

20 Claims, 14 Drawing Sheets

(52) U.S. Cl.
CPC ................. *G09G 2330/021* (2013.01); *G09G 2340/0435* (2013.01); *G09G 2354/00* (2013.01); *G09G 2370/04* (2013.01); *G09G 2370/12* (2013.01)

(58) Field of Classification Search
CPC ........... G09G 2360/18; G09G 2370/04; G09G 2370/10; G09G 5/00; G09G 5/006; G09G 5/36
See application file for complete search history.

(56) References Cited

U.S. PATENT DOCUMENTS

| | | | | |
|---|---|---|---|---|
| 9,905,193 | B2 | 2/2018 | Oh et al. | |
| 10,818,270 | B2 | 10/2020 | Bae et al. | |
| 11,037,477 | B2 | 6/2021 | Choi et al. | |
| 11,631,355 | B2 | 4/2023 | Park et al. | |
| 11,693,466 | B2 | 7/2023 | Park et al. | |
| 2013/0021352 | A1* | 1/2013 | Wyatt | G09G 5/395 345/520 |
| 2014/0168233 | A1* | 6/2014 | Brijesh | G09G 5/006 345/520 |
| 2015/0138212 | A1 | 5/2015 | Bae et al. | |
| 2019/0325844 | A1 | 10/2019 | Ansari et al. | |
| 2021/0055848 | A1 | 2/2021 | Bae et al. | |
| 2021/0266495 | A1 | 8/2021 | Fan et al. | |

FOREIGN PATENT DOCUMENTS

| | | | |
|---|---|---|---|
| KR | 20150057404 | A | 5/2015 |
| KR | 101786649 | B1 | 10/2017 |
| KR | 20190074776 | A | 6/2019 |
| KR | 20200037530 | A | 4/2020 |
| KR | 102247742 | B1 | 4/2021 |
| KR | 20220129151 | A | 9/2022 |
| KR | 102674204 | B1 | 6/2024 |

OTHER PUBLICATIONS

Written Opinion of the ISA for PCT/KR2023/014714 mailed Jan. 11, 2024, 4 pages.

* cited by examiner

ELECTRONIC DEVICE AND METHOD FOR TRANSMISSION TO DISPLAY DRIVING CIRCUIT

CROSS-REFERENCE TO RELATED APPLICATIONS

This application is a continuation of International Application No. PCT/KR2023/014714, designating the United States, filed on Sep. 25, 2023, in the Korean Intellectual Property Receiving Office, and claiming priority to Korean Patent Application Nos. 10-2022-0125366 filed on Sep. 30, 2022, and 10-2022-0171011 filed on Dec. 8, 2022, the disclosures of each of which are incorporated by reference herein in their entireties.

BACKGROUND

Field

The disclosure relates to an electronic device and a method for a transmission to display driver circuitry.

Description of Related Art

An electronic device may include a display panel. For example, the display panel may be used to display an image. For example, a refresh rate used to display the image may be adaptively changed. For example, the electronic device may display, on the display panel, an image based on a first refresh rate from among a plurality of refresh rates configured in the electronic device. For example, the electronic device may display, on the display panel, an image based on a second refresh rate higher than the first refresh rate from among the plurality of refresh rates.

The above-described information may be provided as a related art for the purpose of helping to understand the present disclosure. No claim or determination is raised as to whether any of the above-described information may be applied as a prior art related to the present disclosure.

SUMMARY

In an example embodiment, an electronic device may include comprise at least one processor including processing circuitry; display driver circuitry operably coupled to the processor; and a display panel operably coupled to the display driver circuitry. The at least one processor may be configured to, in response to obtaining a second image subsequent to a first image displayed on the display panel, identify a time length between a first timing at which a transmission of the first image to the display driver circuitry was started for the displaying of the first image and a second timing which is a start timing of a time period corresponding to a refresh rate for the second image; based on the time length longer than or equal to a reference length, display, on the display panel, using the display driver circuitry, the second image by executing multiple transmissions of the second image to the display driver circuitry within the time period from the second timing; and based on the time length shorter than the reference length, display, on the display panel, using the display driver circuitry, the second image by executing a single transmission of the second image to the display driver circuitry within the time period from the second timing.

In an example embodiment, a method may be executed in an electronic device including display driver circuitry and a display panel operably coupled to the display driver circuitry. The method may include, in response to obtaining a second image subsequent to a first image displayed on the display panel, identifying a time length between a first timing at which a transmission of the first image to the display driver circuitry was started for the displaying of the first image and a second timing which is a start timing of a time period corresponding to a refresh rate for the second image; based on the time length longer than or equal to a reference length, displaying, on the display panel, using the display driver circuitry, the second image by executing multiple transmissions of the second image to the display driver circuitry within the time period from the second timing; and based on the time length shorter than the reference length, displaying, on the display panel, using the display driver circuitry, the second image by executing a single transmission of the second image to the display driver circuitry within the time period from the second timing.

In an example embodiment, an electronic device may include at least one processor; display driver circuitry operably coupled to the processor; and a display panel operably coupled to the display driver circuitry. The at least one processor may be configured to, in response to obtaining a second image subsequent to a first image displayed on the display panel, identify a refresh rate for the second image; based on the refresh rate lower than or equal to a reference refresh rate, display, on the display panel, using the display driver circuitry, the second image by executing multiple transmissions of the second image to the display driver circuitry within a time period corresponding to the refresh rate; and based on the refresh rate higher than the reference refresh rate, display, on the display panel, using the display driver circuitry, the second image by executing a single transmission of the second image to the display driver circuitry within the time period.

In an example embodiment, a method may be executed in an electronic device including display driver circuitry and a display panel operably coupled to the display driver circuitry. The method may include, in response to obtaining a second image subsequent to a first image displayed on the display panel, identifying a refresh rate for the second image; based on the refresh rate lower than or equal to a reference refresh rate, displaying, on the display panel, using the display driver circuitry, the second image by executing multiple transmissions of the second image to the display driver circuitry within a time period corresponding to the refresh rate; and based on the refresh rate higher than the reference refresh rate, displaying, on the display panel, using the display driver circuitry, the second image by executing a single transmission of the second image to the display driver circuitry within the time period.

In an example embodiment, an electronic device may include at least one processor; display driver circuitry operably coupled to the processor; and a display panel operably coupled to the display driver circuitry. The at least one processor may be configured to display, on the display panel, using the display driver circuitry, the first image by executing at least one transmission of a first image to the display driver circuitry based on a first refresh rate; while the first image is displayed by executing the at least one transmission of the first image, identify whether a second image subsequent to the first image is obtained within a reference time period from a start timing of the displaying of the first image; in response to identifying that the second image is obtained within the reference time period, display, on the display panel, using the display driver circuitry, the second image by executing at least one transmission of the second image to the display driver circuitry based on a second refresh rate for the second image; and in response to identifying that the second image is not obtained within the reference time period, maintain the displaying of the first image on the display panel using the display driver circuitry, by executing at least one transmission of the first image to the display driver circuitry based on at least one fourth refresh rate, wherein the at least one fourth refresh rate is between the first refresh rate and a third refresh rate, wherein the third refresh rate is the lowest refresh rate available in the electronic device.

In an example embodiment, a method may be executed in an electronic device including display driver circuitry and a display panel operably coupled to the display driver circuitry. The method may include displaying, on the display panel, using the display driver circuitry, the first image by executing at least one transmission of a first image to the display driver circuitry based on a first refresh rate; while the first image is displayed by executing the at least one transmission of the first image, identifying whether a second image subsequent to the first image is obtained within a reference time period from a start timing of the displaying of the first image; in response to identifying that the second image is obtained within the reference time period, displaying, on the display panel, using the display driver circuitry, the second image by executing at least one transmission of the second image to the display driver circuitry based on a second refresh rate for the second image; and in response to identifying that the second image is not obtained within the reference time period, maintaining the displaying of the first image on the display panel using the display driver circuitry, by executing at least one transmission of the first image to the display driver circuitry based on at least one fourth refresh rate, wherein the at least one fourth refresh rate is between the first refresh rate and a third refresh rate, wherein the third refresh rate is the lowest refresh rate available in the electronic device.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
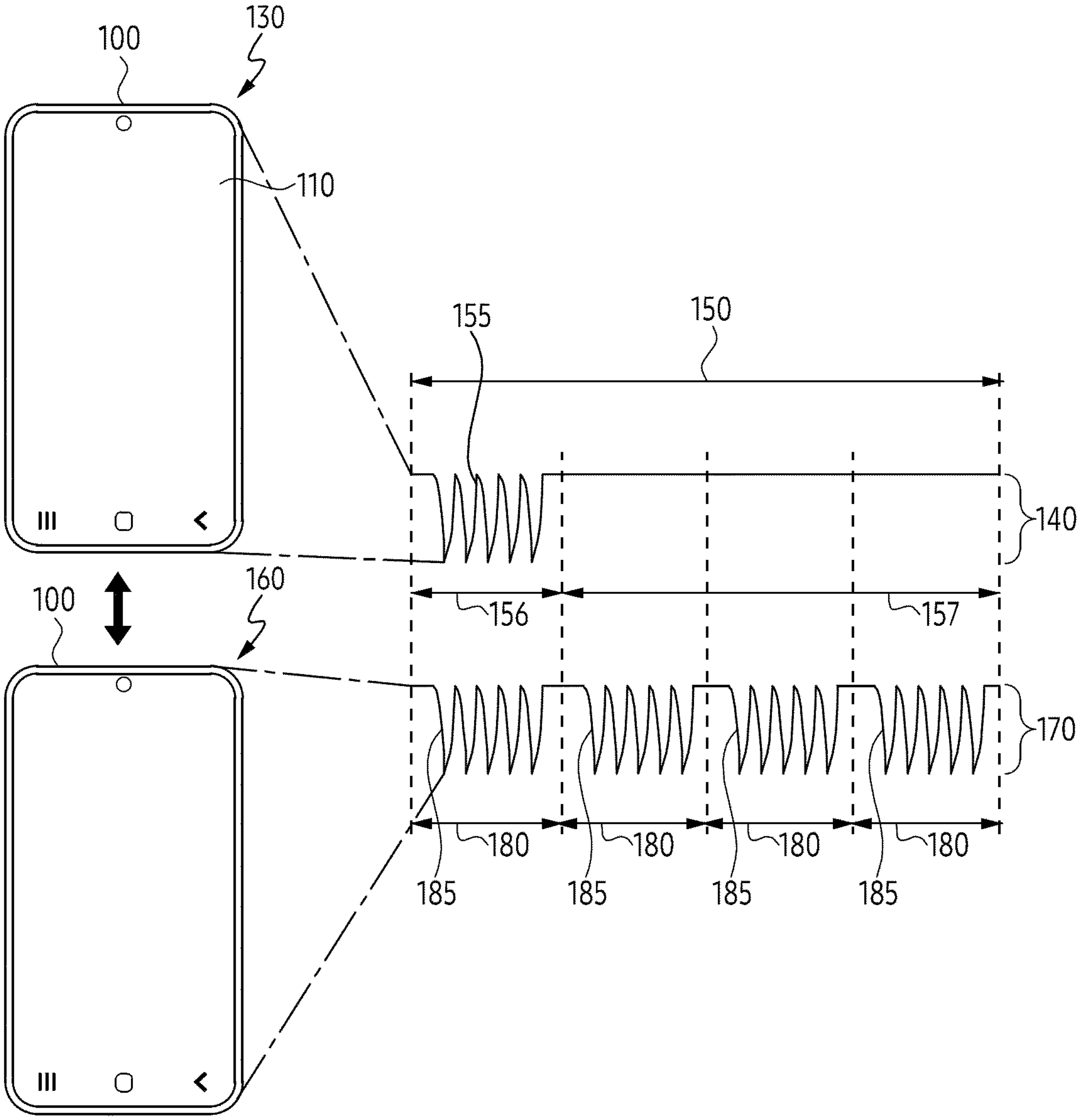
FIG. 1 illustrates an example electronic device that adaptively changes a refresh rate to display an image on a display panel.

FIG. 1 illustrates an example electronic device that adaptively changes a refresh rate to display an image on a display panel.

Referring to FIG. 1, an electronic device 100 may include a display panel 110. For example, the display panel 110 may be used to display an image. For example, the electronic device 100 may display the image on the display panel 110 based on a refresh rate.

In this disclosure, the refresh rate for an image may refer, for example, to a frequency targeted for displaying of the image when obtaining or rendering the image, or indicate the number of times per second to refresh the image on the display panel 110. For example, the refresh rate for an image may correspond to a time period identified for the image when the image is obtained or rendered. For example, an end timing of a time period identified when obtaining the first image may match a start timing of displaying of a second image subsequent to the first image or may be after a start timing of displaying of the second image. For example, the end timing of the time period identified when obtaining the first image may match a start timing of next displaying (or redisplaying) of the first image or may be after a start timing of the next displaying of the first image.

For example, the electronic device 100 may adaptively change the refresh rate. For example, the electronic device 100 may lower the refresh rate to reduce power consumed by displaying an image on the display panel 110. For example, lowering the refresh rate may be executed based on identifying that the displaying of the image is maintained. For example, lowering the refresh rate may be executed based on identifying displaying of a static image. For example, the electronic device 100 may raise the refresh rate to enhance a quality of an image displayed on the display panel 110. For example, raising the refresh rate may be executed based on identifying displaying of a dynamic image. For example, raising the refresh rate may be executed based on identifying an event, such as reception of a user input.

For example, the electronic device 100 may display an image based on a first refresh rate, as in a state 130. For example, the electronic device 100 may display an image based on a second refresh rate higher than the first refresh rate, as in a state 160. For example, the electronic device 100 may change the state 130 to the state 160 to enhance a quality of an image displayed on the display panel 110. For example, the electronic device 100 may change the state 160 to the state 130 to reduce the power consumed by displaying an image on the display panel 110.

For example, the state 130 reduces the power consumed by displaying an image on the display panel 110, but an afterimage (or image sticking, or image persistence) may be caused in the state 130. For example, power consumed in the state 130 is less than power consumed in the state 160, but a probability of afterimage to be caused in the state 130 may be higher than a probability of an afterimage to be caused in the state 160.

For example, a chart 140 illustrates an example of displaying an image in the state 130. A horizontal axis of the chart 140 indicates time, and a vertical axis of the chart 140 indicates a state of a signal outputted from a source driver to display an image on the display panel 110. For example, in the state 130, the electronic device 100 may display an image on display panel 110 within a time period 150 corresponding to the first refresh rate for the image. For example, on a condition that the first refresh rate is 30 hertz (Hz), the time period 150 may be 1/30 seconds(s). For example, the time period 150 may include a partial time period 156 and a partial time period 157. For example, the electronic device 100 may display the image on the display panel 110 within the time period 150, by outputting a signal 155 within the partial time period 156. For example, the signal 155 may be outputted within the partial time period 156 and not be outputted within the partial time period 157.

For example, a chart 170 illustrates an example of displaying an image in the state 160. A horizontal axis of the chart 170 indicates time, and a vertical axis of the chart 170 indicates a state of a signal outputted from a source driver to display an image on the display panel 110. For example, in the state 160, the electronic device 100 may display an image on the display panel 110 within a time period 180 corresponding to the second refresh rate for the image. For example, on a condition that the second refresh rate is 120 (Hz), the time period 180 may be 1/120 (s). For example, the electronic device 100 may display the image on the display panel 110 within the time period 180 by outputting a signal 185 within the time period 180. For example, a length of the time period 180 may correspond to the partial time period 156.

For example, the time period 150 for the first refresh rate includes the partial time period 157 in which the signal 155 is not outputted, unlike the time period 180 for the second refresh rate, so a probability of afterimage to be caused in the state 130 may be higher than a probability of afterimage to be caused in the state 160. For example, afterimage may be caused by hysteresis in a driving transistor to drive an organic light emitting diode (or sub-pixel) in the display panel 110. The hysteresis will be discussed with reference to FIG. 2.

Figure 2:
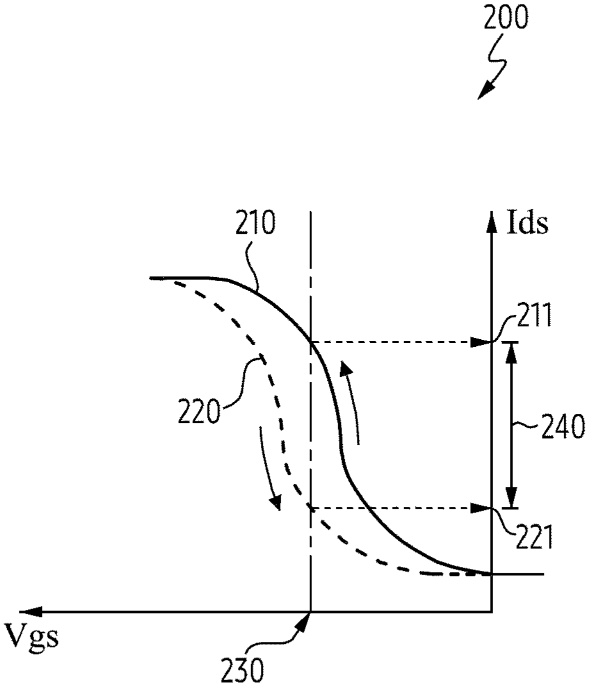
FIG. 2 is a chart illustrating hysteresis in a driving transistor.

FIG. 2 is a chart illustrating hysteresis in a driving transistor.

Referring to FIG. 2, a threshold voltage of the driving transistor may be shifted when an image of a first color (e.g., black) is changed to an image of a second color (e.g., white). For example, the shifting of the threshold voltage may cause a change in luminance provided by an organic light emitting diode driven through the driving transistor.

For example, a chart 200 indicates the change. A horizontal axis of the chart 200 indicates a gate-source voltage (Vgs) of the driving transistor, and a vertical axis of the chart 200 indicates a current applied to the organic light emitting diode (or current from a drain of the driving transistor to a source of the driving transistor) (Ids). For example, a line 210 in the chart 200 indicates a relation between a gate-source voltage (Vgs) and a current (Ids) for an image of the first color, and a line 220 in the chart 200 indicates a relation between a gate-source voltage (Vgs) and a current (Ids) for an image of the second color. As in the chart 200, the line 220 may be offset with respect to the line 210. For example, a value 211 of the current (Ids) at the line 210 when the gate-source voltage (Vgs) is a value 230 may be different from a value 221 of the current (Ids) at the line 220 when the gate-source voltage (Vgs) is the value 230. For example, a difference 240 between the value 211 and the value 221 may cause afterimage.

Referring back to FIG. 1, the electronic device 100 may execute operations for reducing the afterimage, as discussed below.

For example, the electronic device 100 may enhance a quality of an image displayed on the display panel 110 by changing the state 130 to the state 160. For example, the electronic device 100 may reduce power consumed while displaying an image on the display panel 110, by changing the state 160 to the state 130. For example, in a case that a difference between the first refresh rate above and the second refresh rate is greater than or equal to a certain level, a direct change from the state 130 to the state 160 may enhance an image quality, but the direct change from the state 130 to the state 160 may cause flickering. For example, in a case that a difference between the first refresh rate and the second refresh rate is greater than or equal to a certain level, a direct change from the state 160 to the state 130 may reduce power consumption, but the direct change from the state 160 to the state 130 may cause flickering. The flickering will be described with reference to FIG. 3.

Figure 3:
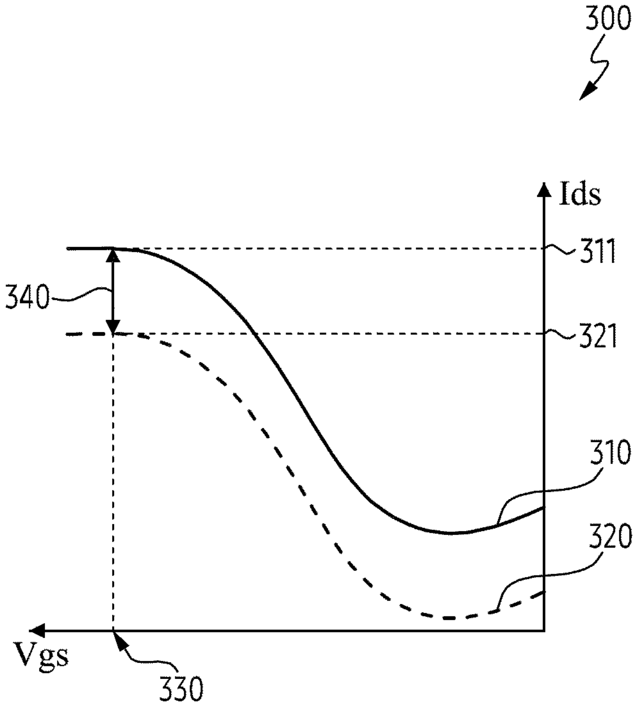
FIG. 3 is a chart illustrating a change in a current applied to an organic light emitting diode according to a change in a refresh rate.

FIG. 3 is a chart illustrating a change in a current applied to an organic light emitting diode according to a change in a refresh rate.

Referring to FIG. 3, a relationship between a gate-source voltage of the driving transistor and a current applied to the organic light emitting diode (or a current from a drain of the driving transistor to a source of the driving transistor) may be changed according to a change in the refresh rate. For example, a relation that is changed according to the refresh rate may cause the flickering.

For example, a chart 300 indicates the change in the relation according to the change in the refresh rate. A horizontal axis of the chart 300 indicates a gate-source voltage (Vgs) of the driving transistor, and a vertical axis of the chart 300 indicates a current applied to the organic light emitting diode (or a current from a drain of the driving transistor to a source of the driving transistor) (Ids). For example, a line 310 in the chart 300 indicates a relation between a gate-source voltage (Vgs) and a current (Ids) for the first refresh rate, and a line 320 in the chart 300 indicates a relationship between a gate-source voltage (Vgs) and a current (Ids) for the second refresh rate. As in the chart 300, the line 320 may be offset with respect to the line 310. For example, a value 311 of the current (Ids) at the line 310 when the gate-source voltage (Vgs) is a value 330 may be different from a value 321 of the current (Ids) at the line 320 when the gate-source voltage (Vgs) is the value 330. For example, in a case that a difference 340 between the value 311 and the value 321 is greater than or equal to a certain level, a direct change from the state 130 to the state 160 and/or a direct change from the state 130 to the state 130 may cause the flickering.

Referring back to FIG. 1, the electronic device 100 may execute operations for reducing the flickering according to the change in the refresh rate, as described below.

Figure 4:
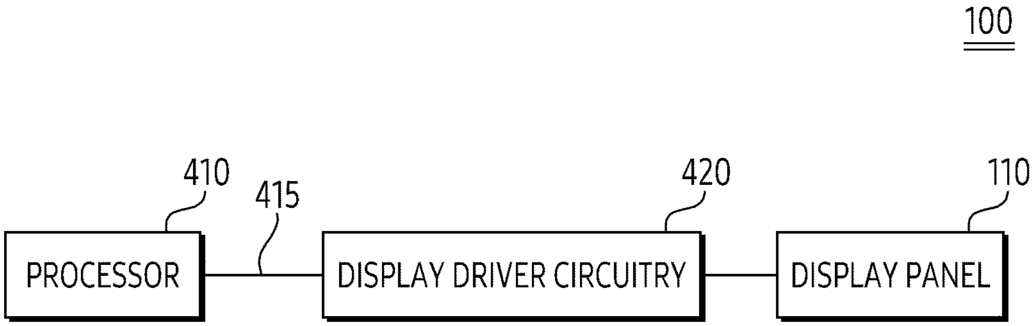
FIG. 4 is a simplified block diagram of an example electronic device according to various embodiments.

FIG. 4 is a simplified block diagram of an example electronic device according to various embodiments.

Referring to FIG. 4, an electronic device 100 may include at least one processor 410, display driver circuitry 420, and a display panel 110.

Figure 13:
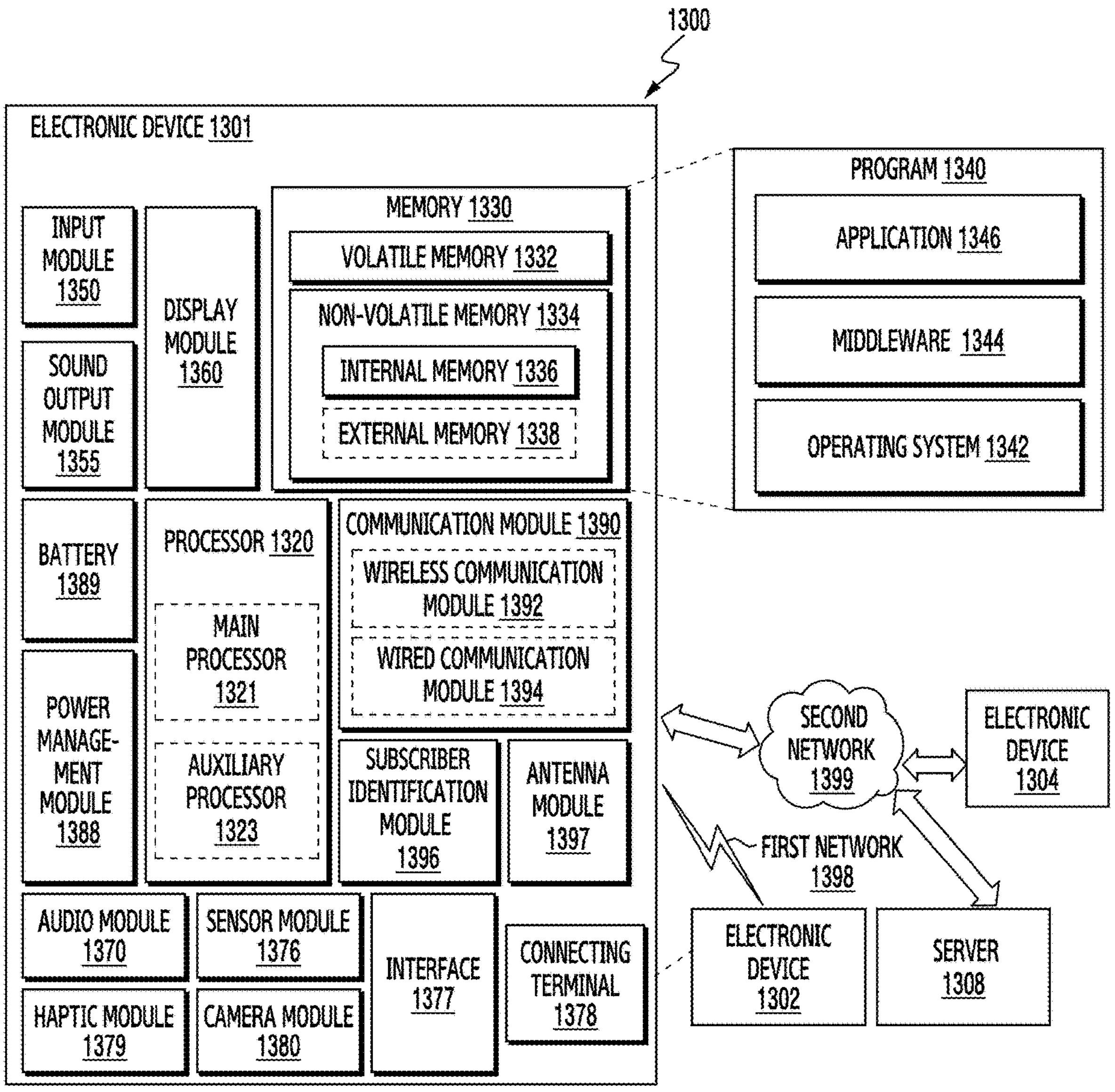
FIG. 13 is a block diagram of an example electronic device in a network environment according to various embodiments.

For example, the processor 410 (including, e.g., processing circuitry) may include at least a portion of the processor 1320 of FIG. 13. For example, the processor 410 may include a central processing unit (CPU), a graphics processing unit (GPU), or a display controller (or display processing unit (DPU)) configured to process an image obtained from a volatile memory in a suitable format for the display panel 110. For example, the processor 410 may be operably (or operatively) coupled with the display driver circuitry 420. For example, the processor 410 being operably coupled with the display driver circuitry 420 may refer to the processor 410 being directly connected with the display driver circuitry 420. For example, the processor 410 being operably coupled with the display driver circuitry 420 may refer to the processor 410 being connected with the display driver circuitry 420 through another component of the electronic device 100. For example, the processor 410 may be connected with the display driver circuitry 420 through an interface 415 (including, e.g., interface circuitry). For example, the interface 415 may be used for an image transmission of from the processor 410 to the display driver circuitry 420. For example, the interface 415 may be a display serial interface (DSI) of a mobile industry process interface (MIPI) alliance. However, the disclosure is not limited in this respect. For example, the processor 410 being operably coupled with the display driver circuitry 420 may refer to the display driver circuitry 420 operating based on instructions executed by the processor 410. For example, the processor 410 being operably coupled with the display driver circuitry 420 may refer to the display driver circuitry 420 being controlled by the processor 410. For example, the processor 410 may display an image on the display panel 110 using the display driver circuitry 420, based on a video mode of the DSI. However, the disclosure is not limited in this respect.

Figure 14:
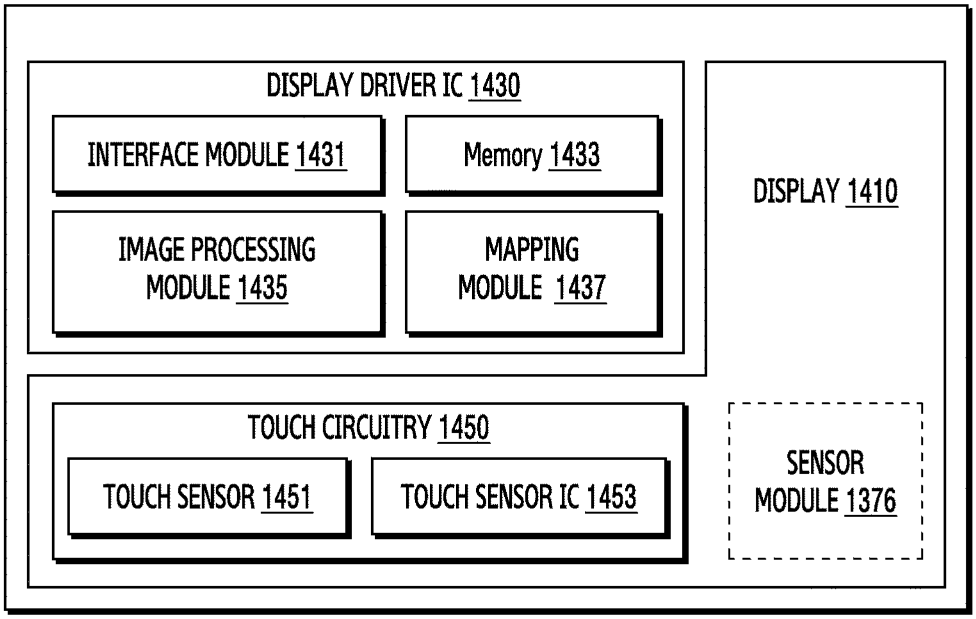
FIG. 14 is a block diagram of an example display module according to various embodiments.

For example, the display driver circuitry 420 may include at least a portion of the display driver integrated circuit (DDI) 1430 of FIG. 14. For example, the display driver circuitry 420 may be operably coupled with the display panel 110. For example, the display driver circuitry 420 being operably coupled with the display panel 110 may refer to that the display driver circuitry 420 being connected with the display panel 110. For example, the display driver circuitry 420 being operably coupled with the display panel 110 may refer to the display panel 110 being controlled by the display driver circuitry 420. However, the disclosure is not limited in this respect.

For example, the display panel 110 may include at least a portion of the display 1410 of FIG. 14.

For example, the processor 410 may execute first operations to reduce afterimage being caused while displaying an image on the display panel 110 in relation to the refresh rate. For example, the processor 410 may execute second operations to reduce flickering being caused while displaying an image on the display panel 110 in relation to the refresh rate. For example, states may be defined for the first operations and the second operations. For example, the processor 410 may execute the first operations within a state (e.g., a second state to be discussed below by way of example) from among the states. For example, the processor 410 may execute the second operations within an intermediate state (e.g., a third state to be discussed below by way of example) between a state (e.g., a second state to be exemplified below) and another state (e.g., a fourth state to be exemplified below) among the states. The states will be described with reference to FIG. 5.

Figure 5:
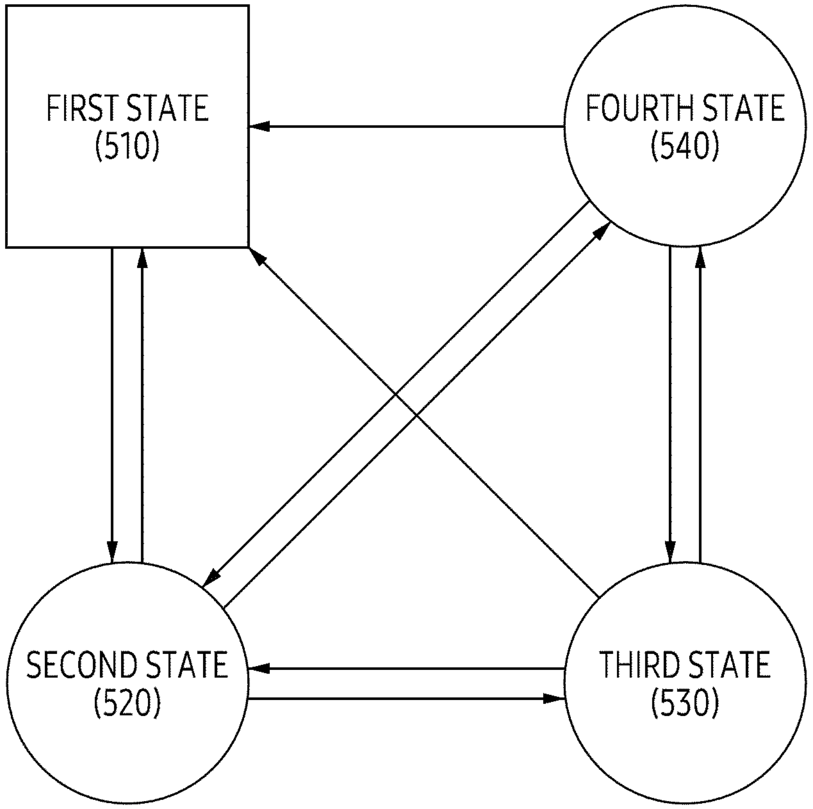
FIG. 5 illustrates an example of states provided for a change in a refresh rate according to various embodiments.

FIG. 5 illustrates an example of states provided for a change in a refresh rate.

Referring to FIG. 5, the states may include a first state 510, a second state 520, a third state 530, and a fourth state 540.

For example, the processor 410 (or the display controller, hereinafter referred to as the processor 410) may obtain data on resources (or parameters) available in the first state 510, the second state 520, the third state 530, and/or the fourth state 540. For example, the data may be obtained based on a service (and/or scenario) provided through one or more software applications used to obtain an image to be displayed in the second state 520, the third state 530, and/or the fourth state 540. For example, the data may be obtained based on an event such as identifying a user input (e.g., touch input) and/or identifying a notification.

For example, the data may indicate resources available in the second state 520. For example, the data may indicate a range of a refresh rate for an image to be displayed in the second state 520. For example, the data, which indicates a maximum refresh rate (or maximum frequency) (or a minimum time period corresponding to the maximum refresh rate) available in the second state (520), may indicate the range. For example, the maximum refresh rate may be lower than or equal to a maximum transmission frequency (e.g., 120 (Hz)) supported by the interface 415. For example, the maximum transmission frequency may correspond to a maximum rate of an image transmission from the processor 410 to the display driver circuitry 420. For example, the maximum refresh rate may higher than or equal to a minimum transmission frequency (e.g., 1 Hz) (or minimum refresh rate) supported by the interface 415. For example, the minimum transmission frequency may correspond to a minimum rate of an image transmission from the processor 410 to the display driver circuitry 420.

For example, the data may indicate a condition for executing multiple transmissions of an image from the processor 410 to the display driver circuitry 420 within the second state 520 (or a condition for executing a single transmission of an image from the processor 410 to the display driver circuitry 420 within the second state 520). For example, the data, which indicates at least one reference length to be discussed below, at least one reference frequency corresponding to the reference length, and/or at least one reference refresh rate to be discussed below, may indicate the condition. For example, the data, which indicates whether the execution of the multiple transmissions is identified based on a time length between a timing at which a transmission of another image before the image was started and a start timing of a time period corresponding to a refresh rate for the image (or start timing of a transmission of the image to be displayed on the display panel 110) or whether the execution of the multiple transmissions is identified based on the refresh rate for the image, may indicate the condition.

For example, the data may indicate the number of the multiple transmissions in the second state 520.

For example, the data may indicate a condition for changing the second state 520 to the third state 530 (or the fourth state 540). For example, the data, which indicates changing the second state 520 to the third state 530 (or the fourth state 540) in response to identifying that displaying of an image (or single image) is maintained on the display panel 110 during a reference time in the second state 520, may indicate the condition. For example, the data, which indicates changing the second state 520 to the third state 530 (or the fourth state 540) in response to identifying that another image subsequent to an image displayed on the display 110 is not obtained within a reference time period from a start timing of the displaying of the image, may indicate the condition.

For example, the data may indicate a condition for changing the third state 530 to the fourth state 540. For example, the data, which indicates changing the third state 530 to the fourth state 540 in response to identifying that displaying of an image (or single image) is maintained on the display panel 110 during a reference time in the third state 530, may indicate the condition. For example, the data, which indicates changing the third state 530 to the fourth state 540 in response to identifying that another image subsequent to an image displayed on the display panel 530 is not obtained within a reference time period from a start timing of the third state 530, may indicate the condition.

For example, the data may indicate at least one refresh rate used in the third state 530. For example, the at least one refresh rate may be a refresh rate (or frequency) between the maximum refresh rate and the minimum transmission frequency, which are available in the second state 520.

For example, the processor 410 may change the first state 510 to the second state 520 in response to obtaining the data.

For example, the processor 410 may obtain, in the second state 520, an image based at least in part on the data obtained in the first state 510, and transmit, to the display driver circuitry 420, the obtained image to display the image on the display panel 110. For example, the second state 520 may indicate a state of obtaining or rendering a new image. For example, unlike the first state 510, the third state 530, and the fourth state 540, the second state 520 may indicate a state of executing obtaining or rendering a new image. For example, the processor 410 displays the image obtained in the second state 520, on the display panel 110, in the third state 530 and the fourth state 540, but the processor 410 may not obtain the image in the third state 530 and the fourth state 540, unlike the second state 520 obtaining the image.

For example, the processor 410 may execute the multiple transmissions of the image to reduce afterimage being caused, in the second state 520. The multiple transmissions will be described below.

For example, the processor 410 may change the second state 520 to the first state 510 to change the data.

For example, the processor 410 may change the second state 520 to the third state 530, based at least in part on the data obtained in the first state 510. For example, the third state 530 may be an intermediate state for changing the second state 520 to the fourth state 540. For example, the processor 410 may change the second state 520 to the third state 530 in order to reduce flickering caused by directly changing the second state 520 to the fourth state 540.

For example, the processor 410 may change the second state 520 to the fourth state 540 based at least in part on the data obtained in the first state 510. For example, on a condition that a value indicating a difference between a refresh rate last used in the second state 520 and the minimum transmission frequency is less than a reference value, the processor 410 may directly change the second state 520 to the fourth state 540. For example, on a condition that a difference between a maximum refresh rate available in the second state 520 and the minimum transmission frequency is less than a reference value, the processor 410 may directly change the second state 520 to the fourth state 540.

For example, the processor 410 may display, in the third state 530, the image obtained in the second state 520. For example, a refresh rate for the image used in the third state 530 may be identical to a refresh rate for the image available in the second state 520 or may be lower than the refresh rate for the image available in the second state 520. For example, a refresh rate used in the third state 530 may be lowered based on a time for which the image is maintained in the third state 530.

For example, the processor 410 may execute, in the third state 530, the multiple transmissions of the image as in the second state 520, or may not execute the multiple transmissions of the image.

For example, the processor 410 may change the third state 530 to the first state 510 to change the data.

For example, the processor 410 may change the third state 530 to the second state 520 in response to identifying obtaining a new image. For example, the processor 410 may change the third state 530 to the second state 520, in response to identifying an event, such as identifying a user input and/or identifying a notification.

For example, the processor 410 may change the third state 530 to the fourth state 540 based at least in part on the data.

For example, the processor 410 may display, in the fourth state 540, the image obtained in the second state 520. For example, the image may be displayed based on the minimum transmission frequency. For example, the fourth state 540 may be provided to display an image with reduced power (e.g., minimum power).

For example, the processor 410 may change the fourth state 540 to the first state 510 to change the data.

For example, the processor 410 may change the fourth state 540 to the second state 520 in response to identifying obtaining a new image. For example, the processor 410 may change the fourth state 540 to the second state 520 in response to identifying raising a refresh rate corresponding to the minimum transmission frequency.

For example, the processor 410 may change the fourth state 540 to the third state 530 in response to identifying obtaining a new image. For example, the third state 530 changed from the fourth state 540 may be an intermediate state for changing the fourth state 540 to the second state 520. For example, the processor 410 may change the fourth state 540 to the second state 520 to reduce flickering caused by directly changing the fourth state 540 to the second state 520.

Referring back to FIG. 4, in a second state (e.g., the second state 520 of FIG. 5) among the states, the processor 410 may execute various operations based on data obtained in a first state (e.g., the first state 510 of FIG. 5) among the states.

For example, in response to obtaining a second image subsequent to a first image displayed on the display panel 110 in the second state, the processor 410 may identify, based on a time length between a first timing at which a transmission of the first image to the display driver circuitry 420 was started for the displaying of the first image and a second timing which is a start timing of a time period corresponding to a refresh rate for the second image, whether to execute multiple transmissions of the second image to the display driver circuitry 420 within the time period from the second timing or to execute a single transmission of the second image to the display driver circuitry 420 within the time period from the second timing. The identification will be described with reference to FIGS. 6 and 7.

Figure 6:
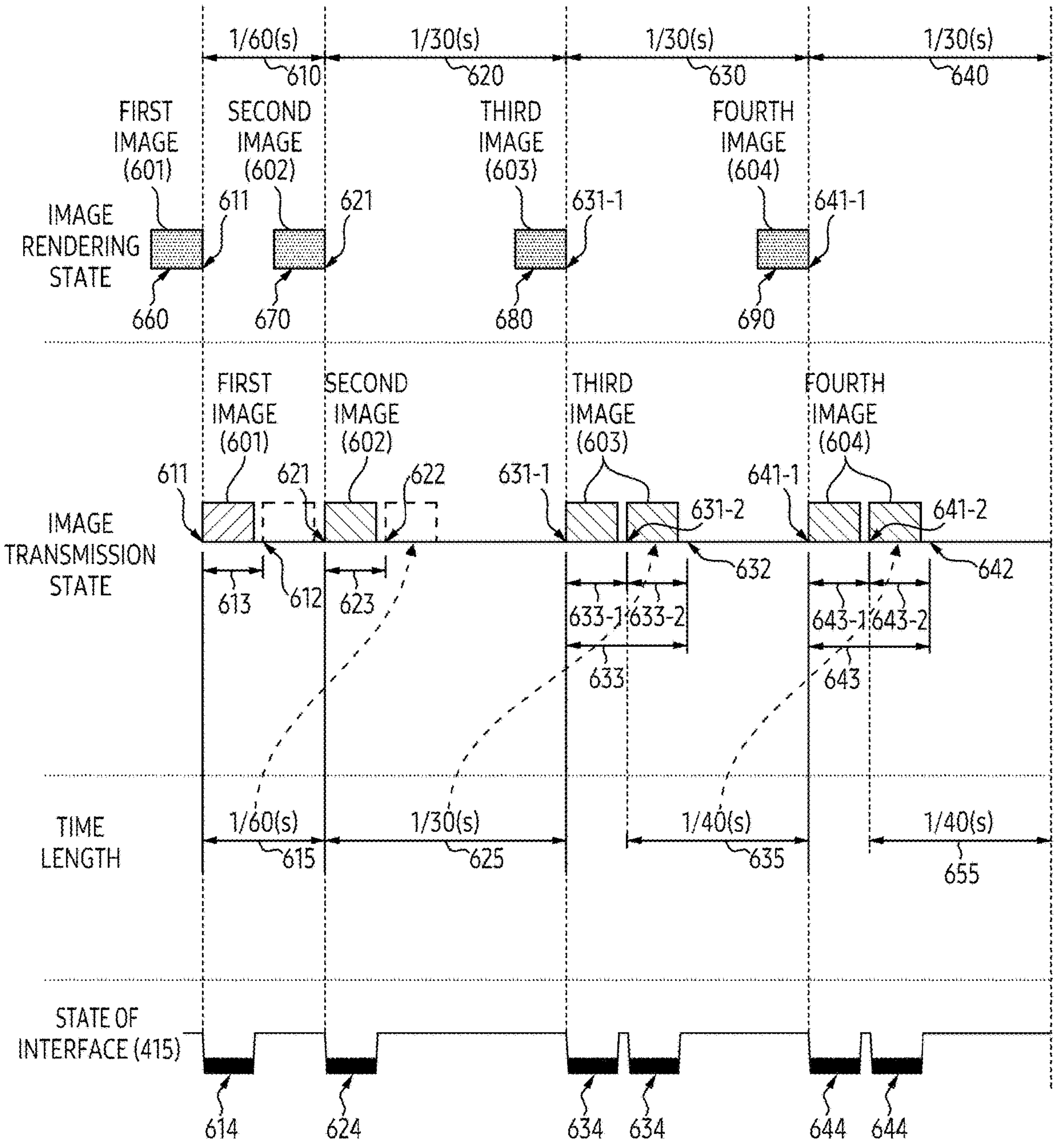
FIGS. 6 and 7 illustrate an example method of a transmission of an image according to a time length in a second state according to various embodiments.
Figure 7:
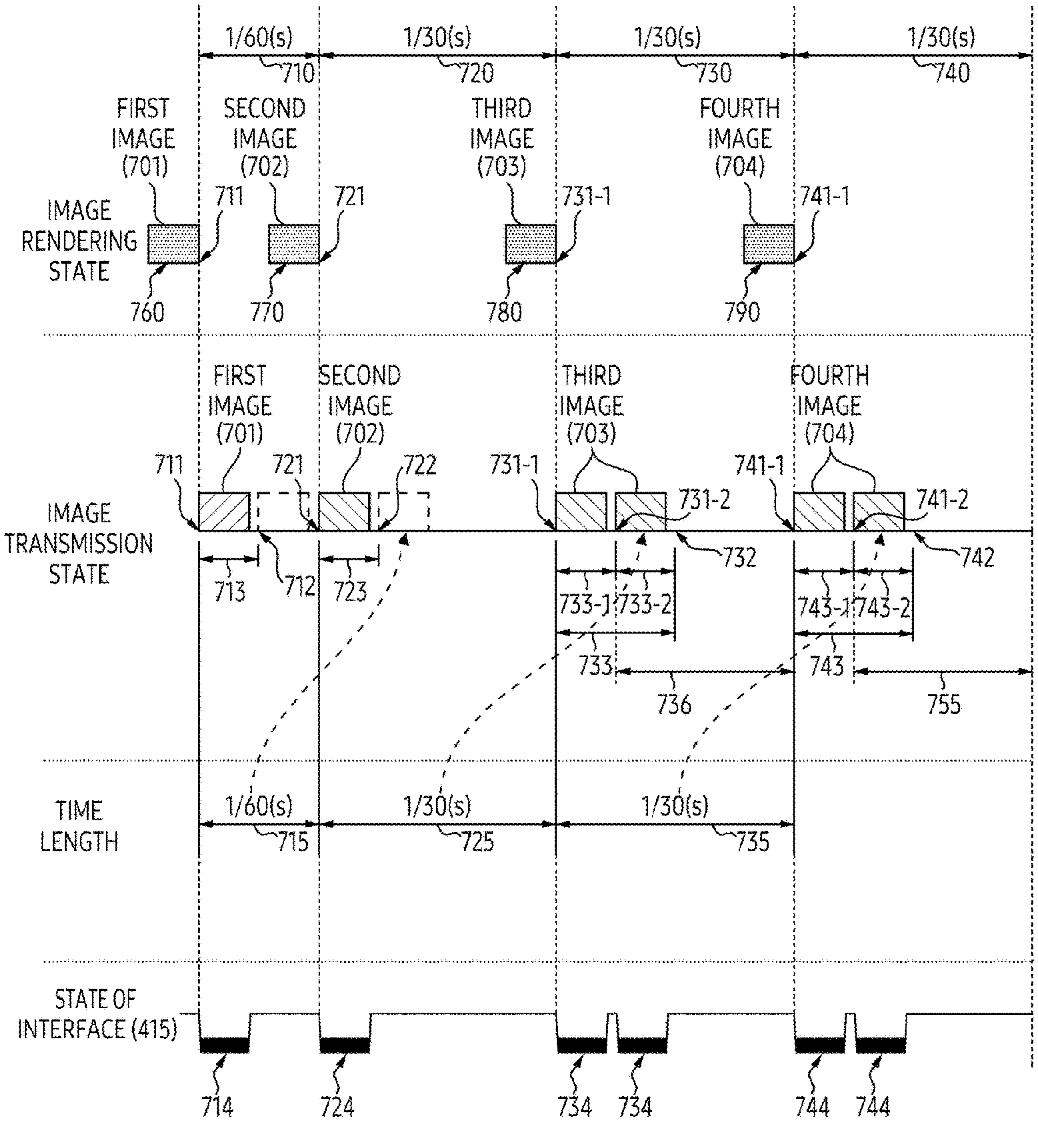

FIGS. 6 and 7 illustrate an example method of a transmission of an image according to a time length in a second state according to various embodiments.

Referring to FIG. 6, the processor 410 may display, in the second state, in response to obtaining or rendering a first image 601 as in a state 660, the first image 601 on the display panel 110 using the display driver circuitry 420, by executing a single transmission of the first image 601 to the display driver circuitry 420 within a time period 610 (e.g., 1/60 (s)) corresponding to a refresh rate (e.g., 60 Hz) for the first image 601.

Although not illustrated in FIG. 6, the CPU and/or the GPU in the processor 410 may input the first image 601 to the display controller in the processor 410, in response to obtaining the first image 601. For example, the display controller may display the first image 601 on the display panel 110 using the display driver circuitry 420 by executing the single transmission of the first image 601 within the time period 610. These operations may be executed equally or similarly for a second image 602, a third image 603, and a fourth image 604 to be illustrated below.

For example, the time period 610 may be identified or targeted when obtaining or rendering the first image 601. For example, the time period 610 may correspond to a cycle of a vertical synchronization signal obtained by the display driver circuitry 420 (or a timing controller in the display driver circuitry 420) for the first image 601. For example, the time period 610 may be longer than or equal to a time period corresponding to the maximum refresh rate indicated by the data obtained in the first state. For example, the single transmission of the first image 601 may be started at a timing 611, which is a start timing of the time period 610. For example, the single transmission of the first image 601 may terminated at a timing 612 within the time period 610. For example, a time length 613 (e.g., 1/120 s) between the timing 611 and the timing 612 may correspond to the maximum transmission frequency (e.g., 120 Hz). For example, the single transmission of the first image 601 through the interface 415 may be indicated as in a state 614. For example, the single transmission of the first image 601 may be identified as identical to or similar to an operation of identifying a single transmission of the second image 602, an operation of identifying multiple transmissions of the third image 603, and an operation of identifying multiple transmissions of the fourth image 604, which will be described below.

For example, the processor 410 may identify, in response to obtaining the second image 602 subsequent to the first image as in a state 670, a time length 615 between a timing 611 at which the single transmission of the first image 601 was started for displaying of the first image 601 and a timing 621, which is a start timing of a time period 620 (e.g., 1/30 s) corresponding to a refresh rate (e.g., 30 (Hz)) for the second image 602. For example, the processor 410 may identify whether the time length 615 is longer than or equal to the reference length (e.g., 1/48 s) indicated by the data obtained in the first state. The processor 410 may display, based on the time length 615 (e.g., 1/60 s) being shorter than the reference length, the second image 602, on the display panel 110, using the display driver circuitry 420, by executing a single transmission of the second image 602 to the display driver circuitry 420 within the time period 620.

For example, the time period 620 may be identified or targeted when obtaining or rendering the second image 602. For example, the time period 620 may correspond to a cycle of a vertical synchronization signal obtained by the display driver circuitry 420 (or the timing controller) for the second image 602. For example, the time period 620 may be longer than the time period 610. For example, the time period 620 may be longer than the time period corresponding to the maximum refresh rate. For example, the single transmission of the second image 602 may be started at a timing 621, which is a start timing of the time period 620. For example, the single transmission of the second image 602 may be terminated at a timing 622 within the time period 620. For example, a time length 623 (e.g., 1/120 s) between the timing 621 and the timing 622 may correspond to the maximum transmission frequency (e.g., 120 Hz). For example, the time length 623 may be identical to the time length 613. For example, a time length during which an image is transmitted from the processor 410 through the interface 415 to the display driver circuitry 420 in the second state may be fixed, like the time length 613 and the time length 623. For example, the single transmission of the second image 602 through the interface 415 may be indicated as in a state 624.

For example, the processor 410 may identify, in response to obtaining a third image 603 subsequent to the second image 602 as in a state 680, a time length 625 between a timing 621 at which the single transmission of the second image 602 was started for displaying of the second image 602 and a timing 631-1 which is a start timing of a time period 630 (e.g., 1/30 s) corresponding to a refresh rate (e.g., 30 Hz) for the third image 603. For example, the processor 410 may identify whether the time length 625 is longer than or equal to the reference length (e.g., 1/48 s). Based on the time length 625 (e.g., 1/30 s) being longer than the reference length, the processor 410 may display the third image 603 on the display panel 110 using the display driver circuitry 420, by executing multiple transmissions of the third image 603 to the display driver circuitry 420 within the time period 630.

For example, the time period 630 may be identified or targeted when obtaining or rendering the third image 603. For example, the time period 630 may correspond to a cycle of a vertical synchronization signal obtained by the display driver circuitry 420 (or the timing controller) for the third image 603. For example, the time period 630 may be longer than the time period 610. For example, the time period 630 may be longer than the time period corresponding to the maximum refresh rate. For example, the multiple transmissions of the third image 603 may be started at a timing 631-1, which is a start timing of the time period 630. For example, the multiple transmissions of the third image 603 may be terminated at a timing 632 within the time period 630. For example, an initial transmission of the third image 603 from among the multiple transmissions of the third image 603 may be started at the timing 631-1 and terminated at a timing 631-2. For example, a time length 633-1 between the timing 631-1 and the timing 631-2 may correspond to the maximum transmission frequency. For example, the time length 633-1 may be identical to the time length 613 and the time length 623. For example, a time length during which an image is transmitted from the processor 410 through the interface 415 to the display driver circuitry 420 within the second state may be fixed, like the time length 613, the time length 623, and the time length 633-1. For example, a last transmission of the third image 603 from among the multiple transmissions of the third image 603 may be started at the timing 631-2 and terminated at the timing 632. For example, a time length 633-2 between the timing 631-2 and the timing 632 may correspond to the maximum transmission frequency. For example, the time length 633-2 may be identical to the time length 613, the time length 623, and the time length 633-1. For example, a time length during which an image is transmitted from the processor 410 through the interface 415 to the display driver circuitry 420 within the second state may be fixed, like the time length 613, the time length 623, the time length 633-1, and the time length 633-2. For example, a time length 633 (1/60 s) between the timing 631-1 and the timing 632 may be a multiple of a time length (1/120 s) corresponding to the maximum transmission frequency (e.g., 120 Hz). For example, the multiple transmissions of the third image 603 through the interface 415 may be indicated as in a state 634.

For example, the processor 410 may identify, in response to obtaining a fourth image 604 subsequent to the third image 603 as in a state 690, a time length 635 between a timing 631-2 at which the last transmission of the third image 603 from among the multiple transmissions of the third image 603 was started for displaying of the third image 603 and a timing 641-1 which is a start timing of a time period 640 (e.g., 1/30 s) corresponding to a refresh rate (e.g., 30 Hz) for the fourth image 604. For example, the processor 410 may identify whether the time length 635 is longer than or equal to the reference length (e.g., 1/48 s). The processor 410 may display, based on the time length 635 (e.g., 1/40(=1/30-1/120) s) being longer than the reference length, the fourth image 604 on the display panel 110 using the display driver circuitry 420, by executing multiple transmissions of the fourth image 604 to the display driver circuitry 420 within the time period 640.

For example, the time period 640 may be identified or targeted when obtaining or rendering the fourth image 604. For example, the time period 640 may correspond to a cycle of a vertical synchronization signal obtained by the display driver circuitry 420 (or the timing controller) for the fourth image 604. For example, the time period 640 may be longer than the time period 610. For example, the time period 640 may be longer than the time period corresponding to the maximum refresh rate. For example, the multiple transmissions of the fourth image 604 may be started at the timing 641-1, which is a start timing of the time period 640. For example, the multiple transmissions of the fourth image 604 may be terminated at a timing 642 within the time period 640. For example, an initial transmission of the fourth image 604 from among the multiple transmissions may be started at the timing 641-1 and terminated at a timing 641-2. For example, a time length 643-1 between the timing 641-1 and the timing 641-2 may correspond to the maximum transmission frequency. For example, the time length 643-1 may be identical to the time length 613, the time length 623, the time length 633-1, and the time length 633-2. For example, a time length during which an image is transmitted from the processor 410 through the interface 415 to the display driver circuitry 420 within the second state may be fixed, like the time length 613, the time length 623, the time length 633-1, the time length 633-2, and the time length 643-1. For example, a last transmission of the fourth image 604 from among the multiple transmissions of the fourth image 604 may be started at the timing 641-2 and terminated at the timing 642. For example, a time length 643-2 between the timing 641-2 and the timing 642 may correspond to the maximum transmission frequency. For example, the time length 643-2 may be identical to the time length 613, the time length 623, the time length 633-1, the time length 633-2, and the time length 643-1. For example, a time length during which an image is transmitted from the processor 410 through the interface 415 to the display driver circuitry 420 within the second state may be fixed like the time length 613, the time length 623, the time length 633-1, the time length 633-2, and the time length 643-1, and the time length 643-2. For example, the time length 643 (1/60 s) between the timing 641-1 and the timing 642 may be a multiple of a time length (1/120 s) corresponding to the maximum transmission frequency (e.g., 120 Hz). For example, the multiple transmissions of the fourth image 604 through the interface 415 may be indicated as in a state 644.

As described above, since the first image 601 is displayed within the time length 615 (e.g., 1/60 s), the second image 602 is displayed within the time length 625 (e.g., 1/30 s), the third image 603 is respectively displayed within the time length 633-1 (e.g., 1/120 s) and the time length 635 (e.g., 1/40 s), and the fourth image 604 is respectively displayed in the time length 643-1 (e.g., 1/120 s) and the time length 655 (e.g., 1/40 s), a refresh rate of the first image 601 on the display panel 110 may be 60 Hz, a refresh rate of the second image 602 on the display panel 110 may be 30 Hz, a refresh rate of the third image 603 on the display panel 110 may be 120 Hz and 40 Hz, respectively, and a refresh rate of the fourth image 604 may be 120 Hz and 40 Hz, respectively. For example, the indicated refresh rate displayed on the display panel 110 may at least partially differ from a refresh rate targeted when obtaining an image. For example, a refresh rate for the third image 603 targeted when obtaining the third image 603 may be different from a refresh rate of the third image 603 displayed on the display panel 110, and a refresh rate for the fourth image 604 targeted when obtaining the fourth image 604 may be different from a refresh rate of the fourth image 604 displayed on the display panel 110.

As described above, the processor 410 may identify whether to perform a single transmission of an image to the display driver circuitry 420 or multiple transmissions of an image to the display driver circuitry 420, based on a timing of a transmission of another image before the image. For example, the processor 410 may identify a time length from a timing of a last transmission of the other image from among one or more transmissions of the other image executed within a time period corresponding to a refresh rate for the other image to a start timing of a time period corresponding to a refresh rate for the image. For example, as illustrated in FIG. 6, identifying the time length may be executed based on the data obtained in the first state. For example, the processor 410 may identify whether the time length is longer than or equal to the reference length. For example, the processor 410 may execute the multiple transmissions of the image based on the time length being longer than or equal to the reference length. For example, the processor 410 may execute the single transmission of the image based on the time length being shorter than the reference length. For example, since the time length longer than or equal to the reference length indicates that a probability of causing afterimage is relatively high and the time length shorter than the reference length indicates that a probability of causing afterimage is relatively low, the execution of the multiple transmissions of the image may reduce afterimage from being caused.

FIG. 6 illustrates that the data indicates identifying a time length from a timing of a last transmission of the other image from among one or more transmissions of the other image executed in a time period corresponding to a refresh rate for the other image to a start timing of a time period corresponding to the refresh rate for the image, but information indicated by the data is not limited thereto. For example, the data may indicate identifying a time length from a timing of an initial transmission of the other image from among one or more transmissions of the other image executed in a time period corresponding to a refresh rate for the other image to a start timing of a time period corresponding to a refresh rate for the image. Identifying the time length will be described with reference to FIG. 7.

Referring to FIG. 7, the processor 410 may display, in the second state, in response to obtaining or rendering a first image 701 as in a state 760, the first image 701 on the display panel 110 using the display driver circuitry 420, by executing a single transmission of the first image 701 to the display driver circuitry 420 within a time period 710 (e.g., 1/60 s) corresponding to a refresh rate (e.g., 60 Hz) for the first image 701.

Although not illustrated in FIG. 7, the CPU and/or the GPU in the processor 410 may input the first image 701 to the display controller in the processor 410, in response to obtaining the first image 701. For example, the display controller may display the first image 701 on the display panel 110 using the display driver circuitry 420 by executing the single transmission of the first image 701 within the time period 710. These operations may be executed equally or similarly for a second image 702, a third image 703, and a fourth image 704 to be described below.

For example, the time period 710 may be identified or targeted when obtaining or rendering the first image 701. For example, the time period 710 may correspond to a cycle of a vertical synchronization signal obtained by the display driver circuitry 420 (or the timing controller in the display driver circuitry 420) for the first image 701. For example, the time period 710 may be longer than or equal to a time period corresponding to the maximum refresh rate indicated by the data obtained in the first state. For example, the single transmission of the first image 701 may be started at a timing 711, which is a start timing of the time period 710. For example, the single transmission of the first image 701 may be terminated at a timing 712 within the time period 710. For example, a time length 713 (e.g., 1/120 s) between the timing 711 and the timing 712 may correspond to the maximum transmission frequency (e.g., 120 Hz). For example, the single transmission of the first image 701 through the interface 415 may be indicated as in a state 714. For example, the single transmission of the first image 701 may be identified as identical to or similar to an operation of identifying a single transmission of the second image 702, an operation of identifying multiple transmissions of the third image 703, and an operation of identifying multiple transmissions of the fourth image 704, which will be described below.

For example, the processor 410 may identify, in response to obtaining the second image 702 subsequent to the first image 701 as in a state 770, a time length 715 between the timing 711 at which the single transmission of the first image 701 was started for displaying of the first image 701 and a timing 721, which is a start timing of a time period 720 (e.g., 1/30 s) corresponding to a refresh rate (e.g., 30 Hz) for the second image 702. For example, the processor 410 may identify whether the time length 715 is longer than or equal to the reference length (e.g., 1/48 s) indicated by the data obtained in the first state. The processor 410 may display, based on the time length 715 (e.g., 1/60 s) being shorter than the reference length, the second image 702 on the display panel 110 using the display driver circuitry 420, by executing a single transmission of the second image 702 to the display driver circuitry 420 within the time period 720.

For example, the time period 720 may be identified or targeted when obtaining or rendering the second image 702. For example, the time period 720 may correspond to a cycle of a vertical synchronization signal obtained by the display driver circuitry 420 (or the timing controller) for the second image 702. For example, the time period 720 may be longer than the time period 710. For example, the time period 720 may be longer than the time period corresponding to the maximum refresh rate. For example, the single transmission of the second image 702 may be started at a timing 721, which is a start timing of the time period 720. For example, the single transmission of the second image 702 may be terminated at a timing 722 within the time period 720. For example, a time length 723 (e.g., 1/120 s) between the timing 721 and the timing 722 may correspond to the maximum transmission frequency (e.g., 120 Hz). For example, the time length 723 may be identical to the time length 713. For example, a time length during which an image is transmitted from the processor 410 through the interface 415 to the display driver circuitry 420 within the second state may be fixed, like the time length 713 and the time length 723. For example, the single transmission of the second image 702 through the interface 415 may be indicated as in a state 724.

For example, the processor 410 may identify, in response to obtaining the third image 703 subsequent to the second image 702 as in a state 780, a time length 725 between the timing 721 at which the single transmission of the second image 702 was started for displaying of the second image 702 and a timing 731-1, which is a start timing of a time period 730 (e.g., 1/30 s) corresponding to a refresh rate (e.g., 30 Hz) for the third image 703. For example, the processor 410 may identify whether the time length 725 is longer than or equal to the reference length (e.g., 1/48 (s)). The processor 410 may display, based on the time length 725 (e.g., 1/30 s) being longer than the reference length, the third image 703 on the display panel 110 using the display driver circuitry 420, by executing multiple transmissions of the third image 703 to the display driver circuitry 420 within the time period 730.

For example, the time period 730 may be identified or targeted when obtaining or rendering the third image 703. For example, the time period 730 may correspond to a cycle of a vertical synchronization signal obtained by the display driver circuitry 420 (or the timing controller) for the third image 703. For example, the time period 730 may be longer than the time period 710. For example, the time period 730 may be longer than the time period corresponding to the maximum refresh rate. For example, the multiple transmissions of the third image 703 may be started at the timing 731-1, which is a start timing of the time period 730. For example, the multiple transmissions of the third image 703 may be terminated at a timing 732 within the time period 730. For example, an initial transmission of the third image 703 from among the multiple transmissions of the third image 703 may be started at the timing 731-1 and terminated at a timing 731-2. For example, a time length 733-1 between the timing 731-1 and the timing 731-2 may correspond to the maximum transmission frequency. For example, the time length 733-1 may be identical to the time length 713 and the time length 723. For example, a time length during which an image is transmitted from the processor 410 through the interface 415 to the display driver circuitry 420 in the second state may be fixed, like the time length 713, the time length 723, and the time length 733-1. For example, a last transmission of the third image 703 from among the multiple transmissions of the third image 703 may be started at the timing 731-2 and terminated at the timing 732. For example, a time length 733-2 between the timing 731-2 and timing the 732 may correspond to the maximum transmission frequency. For example, the time length 733-2 may be identical to the time length 713, the time length 723, and the time length 733-1. For example, a time length during which an image is transmitted from the processor 410 through the interface 415 to the display driver circuitry 420 in the second state may be fixed, like the time length 713, the time length 723, the time length 733-1, and the time length 733-2. For example, a time length 733 (1/60 s) between the timing 731-1 and the timing 732 may be a multiple of a time length (1/120 s) corresponding to the maximum transmission frequency (e.g., 120 Hz). For example, the multiple transmissions of the third image 703 through the interface 415 may be indicated as in a state 734.

For example, the processor 410 may identify, in response to obtaining a fourth image 704 subsequent to the third image 703 as in a state 790, a time length 735 between a timing 731-1 at which an initial transmission of the third image 703 from among the multiple transmissions of the third image 703 was started for displaying of the third image 703 and a timing 741-1, which is a start timing of a time period 740 (e.g., 1/30 s) corresponding to a refresh rate (e.g., 30 Hz) for the fourth image 704. For example, the time length 735 may correspond to a refresh rate (e.g., 30 Hz) for the third image 703, which is an image before the fourth image 704. For example, unlike the data described with reference to FIG. 6, since the data described in FIG. 7 indicates identifying a time length from a timing of an initial transmission of the other image from among one or more transmissions of the other image executed in a time period corresponding to a refresh rate for the other image to a start timing of a time period corresponding to a refresh rate for the image, the time length 735 may correspond to the refresh rate for the third image 703. For example, the processor 410 may identify whether the time length 735 is longer than or equal to the reference length (e.g., 1/48 s). The processor 410 may display, based on the time length 735 being longer than the reference length, the fourth image 704 on the display panel 110 using the display driver circuitry 420, by executing multiple transmissions of the fourth image 704 to the display driver circuitry 420 within the time period 740.

For example, the time period 740 may be identified or targeted when obtaining or rendering the fourth image 704. For example, the time period 740 may correspond to a cycle of a vertical synchronization signal obtained by the display driver circuitry 420 (or the timing controller) for the fourth image 704. For example, the time period 740 may be longer than the time period 710. For example, the time period 740 may be longer than the time period corresponding to the maximum refresh rate. For example, the multiple transmissions of the fourth image 704 may be started at the timing 741-1, which is a start timing of the time period 740. For example, the multiple transmissions of the fourth image 704 may be terminated at the timing 742 within the time period 740. For example, an initial transmission of the fourth image 704 among the multiple transmissions of the fourth image 704 may be started at the timing 741-1 and terminated at a timing 741-2. For example, a time length 743-1 between the timing 741-1 and the timing 741-2 may correspond to the maximum transmission frequency. For example, the time length 743-1 may be identical to the time length 713, the time length 723, the time length 733-1, and the time length 733-2. For example, a time length during which an image is transmitted from the processor 410 through the interface 415 to the display driver circuitry 420 within the second state may be fixed, like the time length 713, the time length 723, the time length 733-1, the time length 733-2, and the time length 743-1. For example, a last transmission of the fourth image 704 among the multiple transmissions of the fourth image 704 may be started at the timing 741-2 and terminated at the timing 742. For example, a time length 743-2 between the timing 741-2 and the timing 742 may correspond to the maximum transmission frequency. For example, the time length 743-2 may be identical to the time length 713, the time length 723, the time length 733-1, the time length 733-2, and the time length 743-1. For example, a time length during which an image is transmitted from the processor 410 through the interface 415 to the display driver circuitry 420 within the second state may be fixed, like the time length 713, the time length 723, the time length 733-1, the time length 733-2, and the time length 743-1 and the time length 743-2. For example, a time length 743 (1/60 s) between the timing 741-1 and the timing 742 may be a multiple of a time length (1/120 s) corresponding to the maximum transmission frequency (e.g., 120 Hz). For example, the multiple transmissions of the fourth image 704 through the interface 415 may be indicated as in a state 744.

As described above, since the first image 701 is displayed within the time length 715 (e.g., 1/60 s), the second image 702 is displayed within the time length 725 (e.g., 1/30 s), the third image 703 is displayed respectively within the time length 733-1 (e.g., 1/120 s) and a time length 736 (e.g., 1/40 s), and the fourth image 704 is displayed respectively within the time length 743-1 (e.g., 1/12 s) and a time length 755 (e.g., 1/40 s), a refresh rate of the first image 701 on the display panel 110 may be 60 Hz, a refresh rate of the second image 702 on the display panel 110 may be 30 Hz, a refresh rate of the third image 703 on the display panel 110 may be 120 Hz and 40 Hz, respectively, and a refresh rate of the fourth image 704 on the display panel 110 may be 120 Hz and 40 Hz, respectively. For example, a refresh rate indicated on the display panel 110 may at least partially differ from a refresh rate targeted when obtaining an image. For example, a refresh rate for the third image 703 targeted when obtaining the third image 703 may be different from a refresh rate of the third image 703 displayed on the display panel 110, and a refresh rate for the fourth image 704 targeted when obtaining the fourth image 704 may be different from a refresh rate of the fourth image 704 displayed on the display panel 110.

As described above, the processor 410 may identify whether to perform a single transmission of an image to the display driver circuitry 420 or multiple transmissions of an image to the display driver circuitry 420, based on a timing of a transmission of another image before the image. For example, the processor 410 may identify a time length from a timing of an initial transmission of the other image from among one or more transmissions of the other image executed within a time period corresponding to a refresh rate for the other image to a start timing of a time period corresponding to a refresh rate for the image. For example, the processor 410 may identify whether the time length is longer than or equal to the reference length. For example, the processor 410 may execute the multiple transmissions of the image, based on the time length being longer than or equal to the reference length. For example, the processor 410 may execute the single transmission of the image based on the time length being shorter than the reference length. For example, since the time length longer than or equal to the reference length indicates that a probability of causing afterimage is relatively high, and a time length shorter than the reference length indicates that a probability of causing afterimage is relatively low, the execution of the multiple transmissions of the image may reduce the afterimage from being caused.

Referring back to FIG. 4, the processor 410 may identify, in response to obtaining a second image subsequent to a first image displayed on the display panel 110 within the second state, based on a refresh rate for the second image (or a time period corresponding to the refresh rate for the second image), whether to execute multiple transmissions of the second image to the display driver circuitry 420 within the time period corresponding to the refresh rate for the second image or execute a single transmission of the second image to the display driver circuitry 420 within the time period. The identification will be described with reference to FIG. 8.

Figure 8:
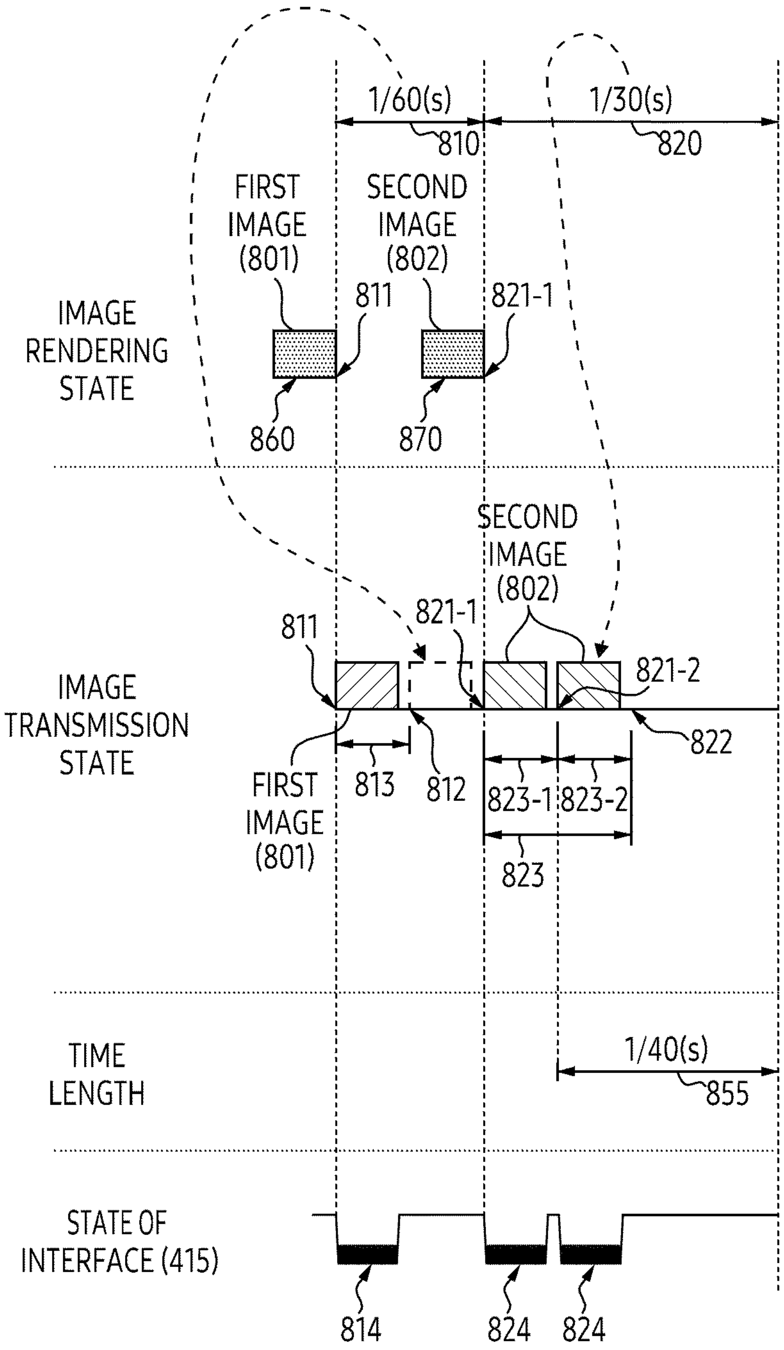
FIG. 8 illustrates an example method of a transmission of an image according to a refresh rate in a second state according to various embodiments.

FIG. 8 illustrates an example method of a transmission of an image according to a refresh rate in a second state according to various embodiments.

Referring to FIG. 8, in response to obtaining a first image 801 as in a state 860, a refresh rate (e.g., 60 Hz) for the first image 801 may be identified in the second state. For example, the processor 410 may identify whether the refresh rate is lower than or equal to the reference refresh rate (e.g., 48 Hz) indicated by the data obtained in the first state. For example, the processor 410 may display, based on the refresh rate being higher than the reference refresh rate, the first image 801 on the display panel 110 using the display driver circuitry 420 by executing a single transmission of the first image 801 to the display driver circuitry 420 within a time period 810.

Although not illustrated in FIG. 8, the CPU and/or the GPU in the processor 410 may input the first image 801 to the display controller in the processor 410, in response to obtaining the first image 801. For example, the display controller can display the first image 801 on the display panel 110 using the display driver circuitry 420, by executing the single transmission of the first image 801 within the time period 810.

For example, the time period 810 may be identified or targeted when obtaining or rendering the first image 801. For example, the time period 810 may correspond to a cycle of a vertical synchronization signal obtained by the display driver circuitry 420 (or the timing controller in the display driver circuitry 420) for the first image 801. For example, the time period 810 may be longer than or equal to a time period corresponding to the maximum refresh rate indicated by the data obtained in the first state. For example, the single transmission of the first image 801 may be started at a timing 811, which is a start timing of the time period 810. For example, the single transmission of the first image 801 may terminated at a timing 812 within the time period 810. For example, a time length 813 (e.g., 1/120 s) between the timing 811 and the timing 812 may correspond to the maximum transmission frequency (e.g., 120 Hz). For example, the single transmission of the first image 801 through the interface 415 may be indicated as in a state 814.

For example, in response to obtaining a second image 802 subsequent to the first image 801 as in a state 870, the processor 410 may identify a refresh rate (e.g., 30 Hz) for the second image 802. For example, the processor 410 may identify whether the refresh rate is lower than or equal to the reference refresh rate (e.g., 48 Hz) indicated by the data obtained in the first state. For example, the processor 410 may display, based on the refresh rate being lower than the reference refresh rate, the second image 802 on the display panel 110 using the display driver circuitry 420, by executing multiple transmissions of the second image 802 to the display driver circuitry 420 within a time period 820.

Although not illustrated in FIG. 8, the CPU and/or the GPU in the processor 410 may input the second image 802 to the display controller in the processor 410, in response to obtaining the second image 802. For example, the display controller may display the second image 802 on the display panel 110 using the display driver circuitry 420, by executing the multiple transmissions of the second image 802 within the time period 820.

For example, the time period 820 may be identified or targeted when obtaining or rendering the second image 802. For example, the time period 820 may correspond to a cycle of a vertical synchronization signal obtained by the display driver circuitry 420 (or the timing controller) for the second image 802. For example, the time period 820 may be longer than the time period 810. For example, the time period 820 may be longer than the time period corresponding to the maximum refresh rate. For example, the multiple transmissions of the second image 802 may be started at a timing 821-1, which is a start timing of the time period 820. For example, the multiple transmissions of the second image 802 may be terminated at a timing 822 within the time period 820. For example, an initial transmission of the second image 802 from among the multiple transmissions of the second image 802 may be started at the timing 821-1 and terminated at a timing 821-2. For example, a time length 823-1 between the timing 821-1 and the timing 821-2 may correspond to the maximum transmission frequency. For example, the time length 823-1 may be identical to the time length 813. For example, a time length during which an image is transmitted from the processor 410 through the interface 415 to the display driver circuitry 420 within the second state may be fixed, like the time length 813 and the time length 823-1. For example, a last transmission of the second image 802 from among the multiple transmissions of the second image 802 may be started at the timing 821-2 and terminated at the timing 822. For example, a time length 823-2 between the timing 821-2 and the timing 822 may correspond to the maximum transmission frequency. For example, the time length 823-2 may be identical to the time length 813 and the time length 823-1. For example, a time length during which an image is transmitted from the processor 410 through the interface 415 to the display driver circuitry 420 within the second state may be fixed, like the time length 813, the time length 823-1, and the time length 823-2. For example, a time length 823 (1/60 s) between the timing 821-1 and the timing 822 may be a multiple of the time length (1/120 s) corresponding to the maximum transmission frequency (e.g., 120 Hz). For example, the multiple transmissions of the second image 802 through the interface 415 may be indicated as in a state 824.

As described above, since the first image 801 is displayed within the time period 810 (e.g., 1/60 s), and the second image 802 is displayed respectively within the time length 823-1 (e.g., 1/120 s) and the time length (e.g., 1/40 s), a refresh rate of the first image 801 on the display panel 110 may be 60 Hz, and a refresh rate of the second image 802 on the display panel 110 may be 120 Hz and 40 Hz, respectively. For example, the refresh rate indicated on the display panel 110 may at least partially differ from a refresh rate targeted when obtaining an image. For example, a refresh rate for the second image 802 targeted when obtaining the second image 802 may be different from a refresh rate of the second image 802 displayed on the display panel 110.

As described above, the processor 410 may identify whether to execute a single transmission of an image to the display driver circuitry 420 or multiple transmissions of an image to the display driver circuitry 420, based on a refresh rate for the image. For example, whether to execute the single transmission or the multiple transmissions based on the refresh rate may be indicated by the data obtained in the first state. For example, the processor 410 may execute the multiple transmissions of the image based on the refresh rate being lower than or equal to the reference refresh rate. For example, the processor 410 may execute the single transmission of the image based on the refresh rate being higher than the reference refresh rate. For example, since the refresh rate lower than or equal to the reference refresh rate indicates that a probability of causing afterimage is relatively high, and the refresh rate higher than the reference refresh rate indicates that a probability of causing afterimage is relatively low, the execution of the multiple transmissions of the image may reduce afterimage from being caused.

Referring back to FIG. 4, the processor 410 may change the second state to a third state (e.g., the third state 530 of FIG. 5) among the states, on a condition that an image displayed on the display panel 110 within the second state is maintained during a reference time. For example, the third state may be changed from the second state to reduce power consumed by displaying of the image. For example, the third state may be an intermediate state for changing the second state to a fourth state (e.g., the fourth state 540 of FIG. 5) among the states. For example, the third state may be changed from the second state to reduce flickering capable of being caused by a direct change from the second state to the fourth state. Changing the second state to the fourth state through the third state will be described with reference to FIG. 9.

Figure 9:
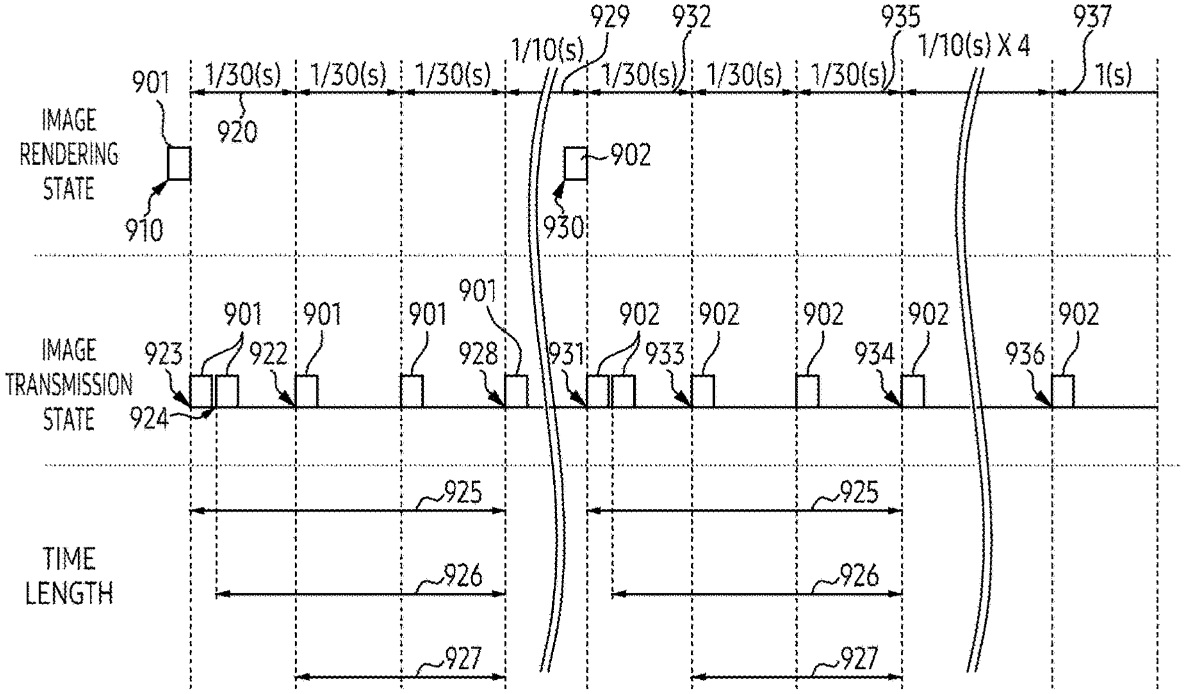
FIG. 9 illustrates an example method of changing a second state to a fourth state through a third state according to various embodiments.

FIG. 9 illustrates an example method of changing a second state to a fourth state through a third state according to various embodiments.

Referring to FIG. 9, the processor 410 may display, in the second state, in response to obtaining a first image 901 as in a state 910, the first image 901 on the display panel 110 using the display driver circuitry 420, by executing one or more transmissions of the first image 901 to the display driver circuitry 420 within a time period 920 corresponding to a first refresh rate (e.g., 30 Hz) for the first image 901, in response to obtaining or rendering the first image 901. For example, the one or more transmissions may be identified through operations described with reference to FIGS. 6 to 8.

For example, the processor 410 may identify executing a single transmission of the first image 901 to the display driver circuitry 420 in response to identifying that a second image 902 subsequent to the first image 901 is not obtained at an end timing 922 of the time period 920 or identifying that the second image 902 is not obtained within the time period 920, and execute, based on the identification, the single transmission while the second image 902 is not obtained. However, the disclosure is not limited in this respect. For example, the processor 410 may identify executing multiple transmissions of the first image 901 to the display driver circuitry 420 through operations described with reference to FIGS. 6 to 8, independently of the second image 902 not being obtained, and execute, based on the identification, the multiple transmissions while the second image 902 is not obtained.

For example, the processor 410 may identify whether displaying of the first image 901 is maintained during a reference time indicated by the data obtained within the first state, based at least in part on the one or more transmissions, within the second state. For example, the data, which indicates the number of time periods 920 corresponding to the first refresh rate for the first image 901, may indicate the reference time. However, the disclosure is not limited in this respect.

For example, a start timing of the reference time may be defined variously. For example, the start timing of the reference time may be defined from a timing 923 corresponding to an initial timing of displaying of the first image 901 (e.g., a start timing 923 of an initial transmission from among the one or more transmissions of the first image 901). In this case, the reference time may be a time 925. For example, the start timing of the reference time may be defined from a start timing 924 of a last transmission from among the one or more transmissions of the first image 901. In this case, the reference time may be a time 926. For example, the start timing of the reference time may be defined from the end timing 922 of the time period 920. In this case, the reference time may be a time 927. However, the disclosure is not limited in this respect.

For example, the processor 410 may change, in response to identifying that displaying of the first image 901 is maintained during the reference time, the second state to the third state at a timing 928. For example, the processor 410 may change, in the third state, the first refresh rate for the first image 901 to a second refresh rate (e.g., 10 Hz) lower than the first refresh rate. For example, a time period 929 corresponding to the second refresh rate may be longer than the time period 920 corresponding to the first refresh rate.

For example, the processor 410 may identify, in response to the change to the third state, whether displaying of the first image 901 is maintained during a reference time indicated by the data obtained in the first state. For example, the reference time used to identify whether displaying of the first image 901 based on the second refresh rate is maintained may be identical to or different from the reference time used to identify whether displaying of the first image 901 based on the first refresh rate is maintained. Although not illustrated in FIG. 9, a start timing of the reference time used to identify whether displaying of the first image 901 based on the second refresh rate is maintained may be defined as identical or similar to a start timing of the reference time used to identify whether displaying of the first image 901 based on the first refresh rate is maintained. However, the disclosure is not limited in this respect.

For example, the processor 410 may change the third state to the second state, in response to identifying that the second image 902 is obtained as in a state 930, before the reference time for identifying whether displaying of the first image 901 based on the second refresh rate is maintained has elapsed. For example, the change from the third state to the second state may be executed at a timing 931. For example, the timing 931 may be a start timing of a time period 932 corresponding to a third refresh rate (e.g., 30 Hz) for the second image 902.

For example, the processor 410 may display, in response to obtaining or rendering the second image 902 in the second state, the second image 902 on the display panel 110 using the display driver circuitry 420, by executing one or more transmissions of the second image 902 to the display driver circuitry 420 within the time period 932. For example, the one or more transmissions may be identified through operations described with respect to FIGS. 6 to 8.

For example, the processor 410 may identify executing a single transmission of the second image 902 to the display driver circuitry 420 in response to identifying that an image (not illustrated in FIG. 9) subsequent to the second image is not obtained at an end timing 933 of the time period 932, or identifying that the image subsequent to the second image 902 is not obtained within the time period 932, and execute, based on the identification, the single transmission while the image subsequent to the second image 902 is not obtained. However, the disclosure is not limited in this respect. For example, the processor 410 may identify executing multiple transmissions of the second image 902 to the display driver circuitry 420 through operations described with reference to FIGS. 6 to 8, independently of the image subsequent to the second image 902 not being obtained, and execute, based on the identification, the multiple transmissions while the image subsequent to the second image 902 is not obtained.

For example, the processor 410 may identify, based at least in part on the one or more transmissions, in the second state, whether displaying of the second image 902 is maintained during a reference time indicated by the data obtained within the second state. For example, as illustrated in FIG. 9, the reference time for the second image 902 in the second state may be identical to the reference time for the first image 901 in the second state, on a condition that the third refresh rate for the second image 902 is identical to the first refresh rate for the first image 901. For example, unlike FIG. 9, the reference time for the second image 902 in the second state may be different from the reference time for the first image 901 in the second state on a condition that the third refresh rate for the second image 902 is different from the first refresh rate for the first image 901. However, the disclosure is not limited in this respect.

For example, the processor 410 may change the second state to the third state at a timing 934, in response to identifying that displaying of the second image 902 is maintained during the reference time. For example, the processor 410 may change, within the third state, the third refresh rate for the second image 902 to a fourth refresh rate (e.g., 10 Hz). For example, a time period corresponding to the fourth refresh rate may be longer than a time period 935 corresponding to the refresh rate.

For example, the processor 410 may identify, in response to the change to the third state, whether displaying of the second image 902 is maintained during a reference time indicated by the data obtained within the first state. For example, the reference time used to identify whether displaying of the second image 902 based on the fourth refresh rate is maintained may be identical to or different from the reference time used to identify whether displaying of the second image 902 based on the refresh rate is maintained. Although not illustrated in FIG. 9, a start timing of the reference time used to identify whether displaying of the second image 902 based on the fourth refresh rate is maintained may be defined as identical or similar to a start timing of the reference time used to identify whether displaying of the second image 902 based on the refresh rate is maintained (or a start timing of the reference time used to identify whether displaying of the first image 901 based on the first refresh rate is maintained). However, the disclosure is not limited in this respect.

For example, in response to identifying that displaying of the second image 902 based on the fourth refresh rate is maintained during the reference time (e.g., 4/10 (=(1/10)×4) s), the processor 410 may change the third state to a fourth state (e.g., the fourth state 540 of FIG. 5) from among the states, at a timing 936. For example, the processor 410 may change the fourth refresh rate for the second image 902 to a fifth refresh rate (e.g., 1 Hz) lower than the fourth refresh rate, within the fourth state. For example, a time period 937 corresponding to the fifth refresh rate may be longer than a time period corresponding to the fourth refresh rate.

As described above, a refresh rate used in the third state may be an intermediate refresh rate between a refresh rate used in the second state and a refresh rate used in the fourth state. For example, since the refresh rate used in the third state is an intermediate refresh rate, a probability of causing flickering according to changing the second state to the fourth state through the third state may be lower than a probability of causing flickering according to directly changing the second state to the fourth state. For example, the electronic device 100 may provide a service of enhanced quality by changing the second state to the fourth state through the third state.

Figure 10:
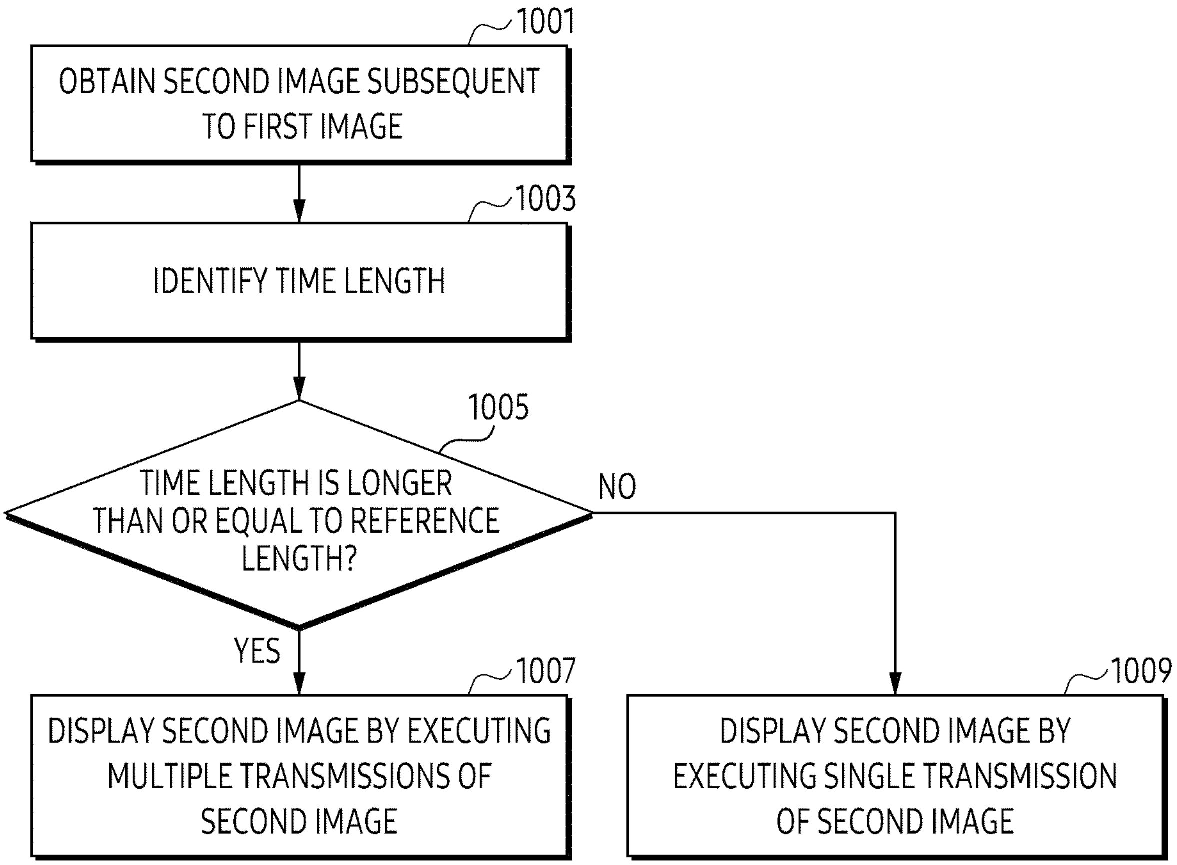
FIG. 10 is a flowchart illustrating an example method of executing a transmission of an image based on a time length according to various embodiments.

FIG. 10 is a flowchart illustrating an example method of executing a transmission of an image based on a time length according to various embodiments. The method may be executed by the at least one processor 410 illustrated in FIG. 4.

Referring to FIG. 10, in operation 1001, the processor 410 may obtain a second image subsequent to a first image displayed on the display panel 110.

In operation 1003, in response to obtaining the second image, the processor 410 may identify a time length between a first timing during which a transmission of the first image to the display driver circuitry 420 was started for the displaying of the first image and a second timing, which is a start timing of a time period corresponding to a refresh rate for the second image. For example, the first image may be an image displayed on the display panel 110 by executing one or more transmissions of the first image to the display driver circuitry 420 within a time period corresponding to a refresh rate for the first image. In this case, the first timing may be a start timing of an initial transmission of the first image from among the one or more transmissions of the first image. For example, the first image may be an image displayed on the display panel 110 by executing multiple transmissions of the first image to the display driver circuitry 420 within a time period corresponding to a refresh rate for the first image. In this case, the first timing may be a start timing of a last transmission of the first image from among the multiple transmissions of the first image.

In operation 1005, the processor 410 may identify whether the time length is longer than or equal to the reference length. For example, the processor 410 may execute operation 1007 based on the time length being longer than or equal to the reference length, and execute operation 1009 based on the time length being shorter than the reference length.

In operation 1007, the processor 410 may display, based on the time length being longer than or equal to the reference length, the second image on the display panel 110 using the display driver circuitry 420, by executing multiple transmissions of the second image to the display driver circuitry 420 within the time period from the second timing. For example, each of the multiple transmissions of the second image may correspond to another refresh rate higher than the refresh rate and may be executed in another time period shorter than the time period.

For example, on a condition that the data obtained within the first state indicates another reference length longer than the reference length, the number of the multiple transmissions of the second image executed based on the time length longer than or equal to the other reference length may be larger than the number of the multiple transmissions of the second image executed based on the time length, which is longer than the reference length and shorter than the other reference length. However, the disclosure is not limited in this respect.

In operation 1009, the processor 410 may display, based on the time length being shorter than the reference length, the second image on the display panel 110 using the display driver circuitry 420, by executing a single transmission of the second image to the display driver circuitry 420 within the time period from the second timing. For example, the single transmission of the second image may be executed within the other time period.

Although not explicitly illustrated in FIG. 10, in an example embodiment, operations 1001 to 1009 may be performed based on a video mode of a display serial interface (DSI).

Although not illustrated in FIG. 10, in an example embodiment, the processor 410 may identify an event indicating changing the refresh rate to another refresh rate higher than the refresh rate while the second image is displayed on the display panel 110. For example, the processor 410 may identify, in response to obtaining a third image subsequent to the second image based on the event, another time length between the second timing or a third timing, which is a start timing of a last transmission of the second image from among the multiple transmissions of the second image, and a fourth timing, which is a start timing of another time period corresponding to the other refresh rate. For example, the processor 410 may display, based on the other time length being longer than the reference length, the third image on the display panel 110 using the display driver circuitry 420, by executing multiple transmissions of the third image to the display driver circuitry 420 within the other time period from the fourth timing. For example, the processor 410 may display, based on the other time length being shorter than or equal to the reference length, the third image on the display panel 110 using the display driver circuitry 420, by executing a single transmission of the third image to the display driver circuitry 420 within the other time period from the fourth timing.

Although not illustrated in FIG. 10, in an example embodiment, the refresh rate may be referred to as a first refresh rate. For example, the processor 410 may identify an event indicating changing the refresh rate to a second refresh rate higher than the first refresh rate while the second image is displayed on the above display panel. For example, the processor 410 may display, based on obtaining a third image subsequent to the second image according to the event, the third image on the display panel 110 using the display driver circuitry 420, by executing at least one transmission of the third image to the display driver circuitry 420 based on the second refresh rate. For example, in response to identifying that displaying of the third image is maintained during a reference time by executing the at least one transmission of the third image based on the second refresh rate, the processor 410 may identify at least one fourth refresh rate between the second refresh rate and the third refresh rate, which will be used to change the second refresh rate to a third refresh rate that is a minimum refresh rate available in the electronic device 100. For example, the processor 410 may maintain displaying of the third image on the display panel 110 using the display driver circuitry 420, by executing at least one transmission of the third image to the display driver circuitry 420 based on the at least one fourth refresh rate changed from the second refresh rate. For example, in response to identifying that displaying of the third image is maintained during a reference time by executing the at least one transmission of the third image based on the at least one fourth refresh rate, the processor 410 may maintain displaying of the third image on the display panel 110 using the display driver circuitry 420 by executing at least one transmission of the third image to the display driver circuitry 420 based on the third refresh rate changed from the at least one fourth refresh rate.

The electronic device 100 may reduce a probability of causing afterimage and flickering through the example operations described above.

Figure 11:
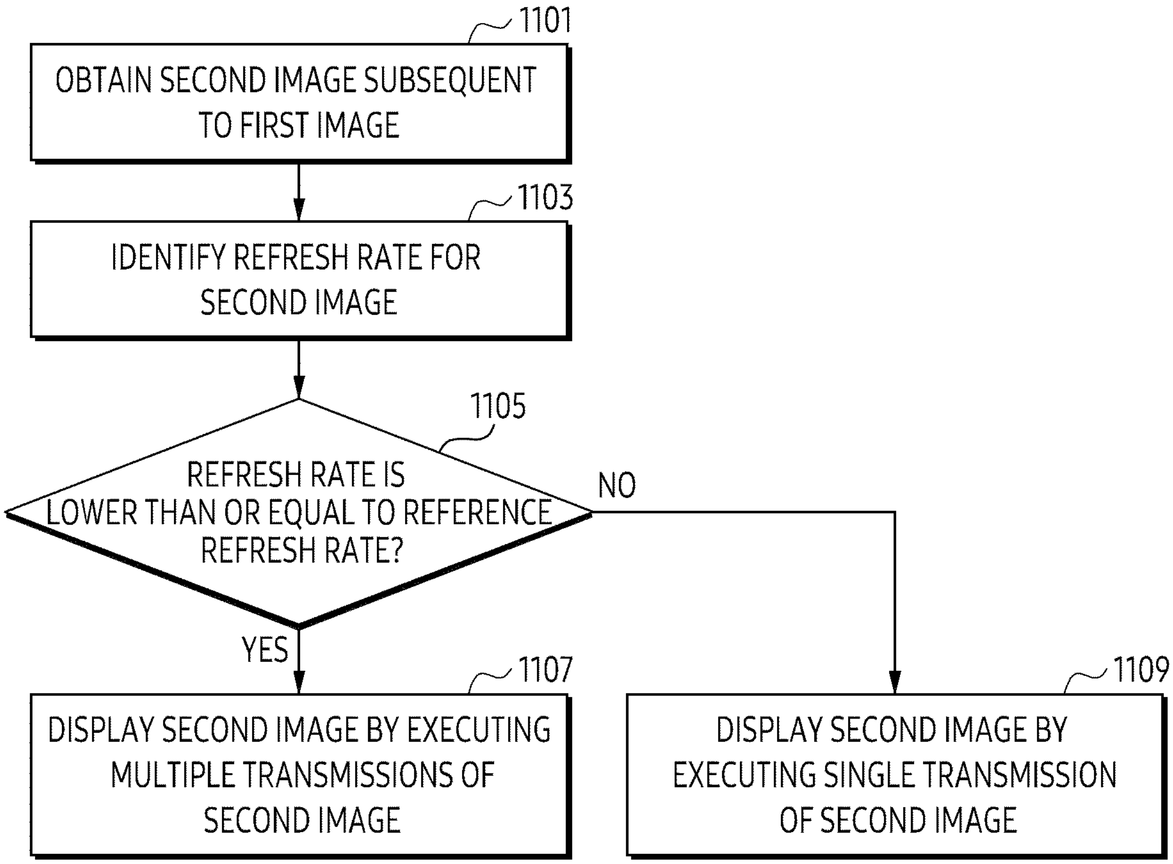
FIG. 11 is a flowchart illustrating an example method of executing a transmission of an image based on a refresh rate according to various embodiments.

FIG. 11 is a flowchart illustrating an example method of executing a transmission of an image based on a refresh rate according to various embodiments. The method may be executed, for example, by the at least one processor 410 illustrated in FIG. 4.

Referring to FIG. 11, in operation 1101, the processor 410 may obtain a second image subsequent to a first image displayed on the display panel 110.

In operation 1103, the processor 410 may identify, in response to obtaining the second image, a refresh rate for the second image.

In operation 1105, the processor 410 may identify whether the refresh rate is lower than or equal to the reference refresh rate. For example, the processor 410 may execute operation 1107 based on the refresh rate being lower than or equal to the reference refresh rate, and may execute operation 1109 based on the refresh rate being higher than the reference refresh rate.

In operation 1107, the processor 410 may display, based on the refresh rate lower than or equal to the reference refresh rate, the second image on the display panel 110 using the display driver circuitry 420, by executing multiple transmissions of the second image to the display driver circuitry 420 within a time period corresponding to the refresh rate. For example, each of the multiple transmissions of the second image may be executed in another time period, corresponding to another refresh rate higher than the refresh rate, wherein the other time period is shorter than the time period. For example, the other refresh rate may be a maximum refresh rate available in the electronic device 100.

For example, on a condition that the data obtained in the first state indicates another reference refresh rate lower than the reference refresh rate, the number of the multiple transmissions of the second image executed based on the refresh rate lower than or equal to the other reference refresh rate may be larger than the number of the multiple transmissions of the second image executed based on the refresh rate, which is lower than the reference refresh rate and higher than the other reference refresh rate. However, the disclosure is not limited in this respect.

In operation 1109, the processor 410 may display, based on the refresh rate being higher than the reference refresh rate, the second image on the display panel 110 using the display driver circuitry 420, by executing a single transmission of the second image to the display driver circuitry 420 within the time period. For example, the single transmission of the second image may be executed within the other time period. For example, the other refresh rate may be a maximum refresh rate available in the electronic device 100.

Although not explicitly illustrated in FIG. 11, in an embodiment, operations 1101 to 1109 may be performed based on a video mode of DSI.

Although not illustrated in FIG. 11, in an embodiment, the refresh rate may be referred to as a first refresh rate. For example, the processor 410 may identify an event indicating that changing the refresh rate to a second refresh rate higher than the first refresh rate while the second image is displayed on the display panel 110. For example, the processor 410 may display, based on obtaining a third image subsequent to the second image according to the event, the third image on the display panel 110 using the display driver circuitry 420, by executing at least one transmission of the third image to the display driver circuitry 420 based on the second refresh rate. For example, in response to identifying that displaying of the third image by executing the at least one transmission of the third image based on the second refresh rate is maintained during a reference time, the processor 410 may identify at least one fourth refresh rate between the second refresh rate and the third refresh rate, which will be used to change the second refresh rate to a third refresh rate that is a minimum refresh rate available in the electronic device 100. For example, the processor 410 may maintain displaying of the third image on the display panel 110 using the display driver circuitry 420, by executing at least one transmission of the third image to the display driver circuitry 420 based on the at least one fourth refresh rate changed from the second refresh rate. For example, in response to identifying that displaying of the third image by executing the at least one transmission of the third image based on the at least one fourth refresh rate is maintained during a reference time, the processor 410 may maintain displaying of the third image on the display panel 110 using the display driver circuitry 420 by executing at least one transmission of the third image to the display driver circuitry 420 based on the third refresh rate changed from the at least one fourth refresh rate.

The electronic device 100 may reduce a probability of causing afterimage and flickering through the operations described above.

Figure 12:
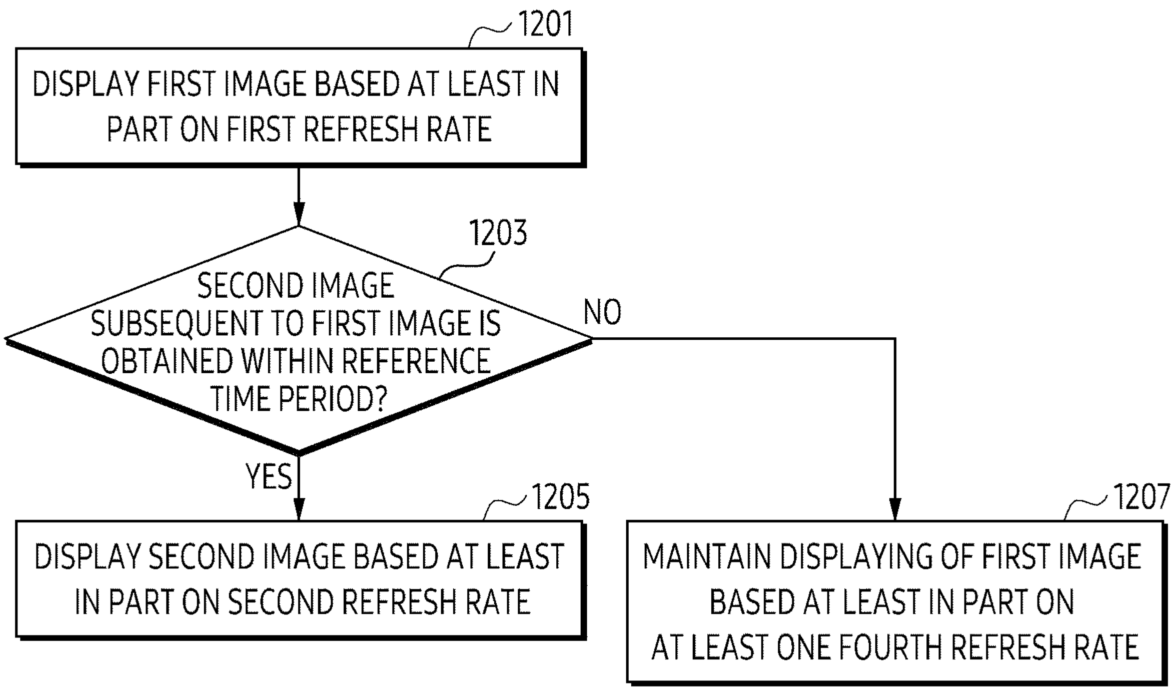
FIG. 12 is a flowchart illustrating an example method of executing a transmission of an image based on whether an image is obtained during a reference time period according to various embodiments.

FIG. 12 is a flowchart illustrating an example method of executing a transmission of an image based on whether an image is obtained during a reference time period according to various embodiments. The method may be executed by the at least one processor 410 illustrated in FIG. 4.

Referring to FIG. 12, in operation 1201, the processor 410 may display a first image on the display panel 110 using the display driver circuitry 420, by executing at least one transmission of the first image to the display driver circuitry 420 based (at least in part) on a first refresh rate.

For example, on a condition that the first refresh rate is lower than or equal to a reference refresh rate, the at least one transmission of the first image executed based on the first refresh rate may include multiple transmissions of the first image executed within a time period corresponding to the first refresh rate. For example, on a condition that the first refresh rate is higher than the reference refresh rate, the at least one transmission of the first image executed based on the first refresh rate may include a single transmission of the first image executed within the time period.

For example, on a condition that a time length between a first timing at which a transmission of a third image prior to the first image to the display driver circuitry 420 was started for the displaying of the third image and a second timing which is a start timing of a time period corresponding to the first refresh rate is longer than or equal to the reference length, the at least one transmission of the first image executed based on the first refresh rate may include multiple transmissions of the first image executed within a time period corresponding to the first refresh rate. For example, on a condition that the time length is shorter than the reference length, the at least one transmission of the first image executed based on the first refresh rate may include a single transmission of the first image executed in the time period.

In operation 1203, the processor 410 may identify whether a second image subsequent to the first image is obtained within a reference time period from a start timing of the displaying of the first image, while the first image is displayed by executing the at least one transmission of the first image. For example, the processor 410 may execute operation 1205 on a condition that the second image is obtained within the reference time period, and operation 1207 on a condition that the second image is not obtained within the reference time period.

In operation 1205, in response to identifying that the second image is obtained within the reference time period, the processor 410 may display the second image on the display panel 110 using the display driver circuitry 420, by executing at least one transmission of the second image to the display driver circuitry 420 based on a second refresh rate for the second image.

In operation 1207, in response to identifying that the second image is not obtained within the reference time period, the processor 410 may maintain the displaying of the first image on the display panel 110 using the display driver circuitry 420, by executing at least one transmission of the first image to the display driver circuitry 420 based on at least one fourth refresh rate, wherein the at least one fourth refresh rate is between the first refresh rate and a third refresh rate, wherein the third refresh rate is a minimum refresh rate available in the electronic device.

For example, the processor 410 may identify whether the second image is obtained during another reference time period from an end timing of the reference time period, while the first image is displayed by executing the at least one transmission of the first image based on the at least one fourth refresh rate. For example, in response to identifying that the second image is obtained within the other reference time period, the processor 410 may display the second image on the display panel 110 by executing at least one transmission of the second image to the display driver circuitry 420 based on a second refresh rate for the second image. For example, in response to identifying that the second image is not obtained within the other reference time period, the processor 410 may maintain the first image on the display panel 110 using the display driver circuitry 420 by executing at least one transmission of the first image to the display driver circuitry 420 based on the third refresh rate.

For example, in response to identifying that the second image is not obtained within the reference time period, the processor 410 may identify the at least one fourth refresh rate to change the first refresh rate to the third refresh rate. For example, the processor 410 may maintain the first image on the display panel using the display driver circuit, by executing the at least one transmission of the first image based on the at least one fourth refresh rate changed from the first refresh rate.

Although not illustrated explicitly in FIG. 12, in an embodiment, operations 1201 to 1207 may be performed based on a video mode of DSI.

The electronic device 100 may reduce a probability of causing afterimage and flickering through the operations described above.

FIG. 13 is a block diagram illustrating an example electronic device 1301 in a network environment 1300 according to various embodiments. Referring to FIG. 13, the electronic device 1301 in the network environment 1300 may communicate with an electronic device 1302 via a first network 1398 (e.g., a short-range wireless communication network), or at least one of an electronic device 1304 or a server 1308 via a second network 1399 (e.g., a long-range wireless communication network). According to an embodiment, the electronic device 1301 may communicate with the electronic device 1304 via the server 1308. According to an embodiment, the electronic device 1301 may include a processor 1320, memory 1330, an input module 1350, a sound output module 1355, a display module 1360, an audio module 1370, a sensor module 1376, an interface 1377, a connecting terminal 1378, a haptic module 1379, a camera module 1380, a power management module 1388, a battery 1389, a communication module 1390, a subscriber identification module (SIM) 1396, or an antenna module 1397. In various embodiments, at least one of the components (e.g., the connecting terminal 1378) may be omitted from the electronic device 1301, or one or more other components may be added in the electronic device 1301. In various embodiments, some of the components (e.g., the sensor module 1376, the camera module 1380, or the antenna module 1397) may be implemented as a single component (e.g., the display module 1360).

The processor 1320 (including, e.g., processing circuitry) may execute, for example, software (e.g., a program 1340) to control at least one other component (e.g., a hardware or software component) of the electronic device 1301 coupled with the processor 1320, and may perform various data processing or computation. According to an embodiment, as at least part of the data processing or computation, the processor 1320 may store a command or data received from another component (e.g., the sensor module 1376 or the communication module 1390) in volatile memory 1332, process the command or the data stored in the volatile memory 1332, and store resulting data in non-volatile memory 1334. According to an embodiment, the processor 1320 may include a main processor 1321 (e.g., a central processing unit (CPU) or an application processor (AP)), or an auxiliary processor 1323 (e.g., a graphics processing unit (GPU), a neural processing unit (NPU), an image signal processor (ISP), a sensor hub processor, or a communication processor (CP)) that is operable independently from, or in conjunction with, the main processor 1321. For example, the various processors may operate individually or collectively to perform operations or functions. For example, when the electronic device 1301 includes the main processor 1321 and the auxiliary processor 1323, the auxiliary processor 1323 may be adapted to consume less power than the main processor 1321, or to be specific to a specified function. The auxiliary processor 1323 may be implemented as separate from, or as part of, the main processor 1321.

The auxiliary processor 1323 may control at least some of functions or states related to at least one component (e.g., the display module 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). According to an embodiment, the auxiliary processor 1323 (e.g., an image signal processor or a communication processor) may be implemented as part of another component (e.g., the camera module 1380 or the communication module 1390) functionally related to the auxiliary processor 1323. According to an embodiment, the auxiliary processor 1323 (e.g., the neural processing unit) may include a hardware structure specified for artificial intelligence model processing. An artificial intelligence model may be generated by machine learning. Such learning may be performed, e.g., by the electronic device 1301 where the artificial intelligence is performed or via a separate server (e.g., the server 1308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input module 1350 (including, e.g., input circuitry) may receive a command or data to be used by another component (e.g., the processor 1320) of the electronic device 1301, from the outside (e.g., a user) of the electronic device 1301. The input module 1350 may include, for example, a microphone, a mouse, a keyboard, a key (e.g., a button), or a digital pen (e.g., a stylus pen).

The sound output module 1355 (including, e.g., sound output circuitry) may output sound signals to the outside of the electronic device 1301. The sound output module 1355 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 1360 may visually provide information to the outside (e.g., a user) of the electronic device 1301. The display module 1360 may include, for example, a display, a hologram device, or a projector and control circuitry to control a corresponding one of the display, hologram device, and projector. According to an embodiment, the display module 1360 may include a touch sensor adapted to detect a touch, or a pressure sensor adapted to measure the intensity of force incurred by the touch.

The audio module 1370 (including, e.g., audio circuitry) may convert a sound into an electrical signal and vice versa. According to an embodiment, the audio module 1370 may obtain the sound via the input module 1350, or output the sound via the sound output module 1355 or a headphone of an external electronic device (e.g., an electronic device 1302) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 (including, e.g., interface circuitry) may support one or more specified protocols to be used for the electronic device 1301 to be coupled with the external electronic device (e.g., the electronic device 1302) directly (e.g., wiredly) or wirelessly. According to an embodiment, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the electronic device 1302). According to an embodiment, the connecting terminal 1378 may include, for example, an HDMI connector, a USB connector, a SD card connector, or an audio connector (e.g., a headphone connector).

The haptic module 1379 (including, e.g., haptic circuitry) may convert an electrical signal into a mechanical stimulus (e.g., a vibration or a movement) or electrical stimulus which may be recognized by a user via his tactile sensation or kinesthetic sensation. According to an embodiment, the haptic module 1379 may include, for example, a motor, a piezoelectric element, or an electric stimulator.

The camera module 1380 (including, e.g., a camera) may capture a still image or moving images. According to an embodiment, the camera module 1380 may include one or more lenses, image sensors, image signal processors, or flashes.

The power management module 1388 may manage power supplied to the electronic device 1301. According to an embodiment, the power management module 1388 may be implemented as at least part of, for example, a power management integrated circuit (PMIC).

The battery 1389 may supply power to at least one component of the electronic device 1301. According to an embodiment, the battery 1389 may include, for example, a primary cell which is not rechargeable, a secondary cell which is rechargeable, or a fuel cell.

The communication module 1390 (including, e.g., communication circuitry) may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors (each including, e.g., communication processing circuitry) that are operable independently from the processor 1320 (e.g., the application processor (AP)) and supports a direct (e.g., wired) communication or a wireless communication. According to an embodiment, the communication module 1390 may include a wireless communication module 1392 (including, e.g., wireless communication circuitry) (e.g., a cellular communication module, a short-range wireless communication module, or a global navigation satellite system (GNSS) communication module) or a wired communication module 1394 (including, e.g., wired communication circuitry) (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or infrared data association (IrDA)) or the second network 1399 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The wireless communication module 1392 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1392 may support a high-frequency band (e.g., the mm Wave band) to achieve, e.g., a high data transmission rate. The wireless communication module 1392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1392 may support various requirements specified in the electronic device 1301, an external electronic device (e.g., the electronic device 1304), or a network system (e.g., the second network 1399). According to an embodiment, the wireless communication module 1392 may support a peak data rate (e.g., 20 Gbps or more) for implementing eMBB, loss coverage (e.g., 1364 dB or less) for implementing mMTC, or U-plane latency (e.g., 0.5 ms or less for each of downlink (DL) and uplink (UL), or a round trip of 13 ms or less) for implementing URLLC.

The antenna module 1397 may transmit or receive a signal or power to or from the outside (e.g., the external electronic device) of the electronic device 1301. According to an embodiment, the antenna module 1397 may include an antenna including a radiating element including a conductive material or a conductive pattern formed in or on a substrate (e.g., a printed circuit board (PCB)). According to an embodiment, the antenna module 1397 may include a plurality of antennas (e.g., array antennas). In such a case, at least one antenna appropriate for a communication scheme used in the communication network, such as the first network 1398 or the second network 1399, may be selected, for example, by the communication module 1390 (e.g., the wireless communication module 1392) from the plurality of antennas. The signal or the power may then be transmitted or received between the communication module 1390 and the external electronic device via the selected at least one antenna. According to an embodiment, another component (e.g., a radio frequency integrated circuit (RFIC)) other than the radiating element may be additionally formed as part of the antenna module 1397.

According to various embodiments, the antenna module 1397 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1301 and the external electronic device 1304 via the server 1308 coupled with the second network 1399. Each of the electronic devices 1302 or 1304 may be a device of a same type as, or a different type from, the electronic device 1301. According to an embodiment, all or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, mobile edge computing (MEC), or client-server computing technology may be used, for example. The electronic device 1301 may provide ultra low-latency services using, e.g., distributed computing or mobile edge computing. In an embodiment, the external electronic device 1304 may include an internet-of-things (IoT) device. The server 1308 may be an intelligent server using machine learning and/or a neural network. According to an embodiment, the external electronic device 1304 or the server 1308 may be included in the second network 1399. The electronic device 1301 may be applied to intelligent services (e.g., smart home, smart city, smart car, or healthcare) based on 5G communication technology or IoT-related technology.

FIG. 14 is a block diagram 1400 illustrating the example display module 1360 according to various embodiments. Referring to FIG. 14, the display module 1360 may include a display 1410 and a display driver integrated circuit (DDI) 1430 to control the display 1410. The DDI 1430 may include an interface module 1431 (including, e.g., interface circuitry), memory 1433 (e.g., buffer memory), an image processing module 1435 (including e.g., image processing circuitry), or a mapping module 1437 (including, e.g., mapping circuitry). The DDI 1430 may receive image information that contains image data or an image control signal corresponding to a command to control the image data from another component of the electronic device 1301 via the interface module 1431. For example, according to an embodiment, the image information may be received from the processor 1320 (e.g., the main processor 1321 (e.g., an application processor)) or the auxiliary processor 1323 (e.g., a graphics processing unit) operated independently from the function of the main processor 1321. The DDI 1430 may communicate, for example, with touch circuitry 1450 or the sensor module 1376 via the interface module 1431. The DDI 1430 may also store at least part of the received image information in the memory 1433, for example, on a frame by frame basis. The image processing module 1435 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 1410. The mapping module 1437 may generate a voltage value or a current value corresponding to the image data pre-processed or post-processed by the image processing module 1435. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 1410 may be driven, for example, based at least in part on the voltage value or the current value such that visual information (e.g., a text, an image, or an icon) corresponding to the image data may be displayed via the display 1410.

According to an embodiment, the display module 1360 may further include the touch circuitry 1450. The touch circuitry 1450 may include a touch sensor 1451 and a touch sensor IC 1453 to control the touch sensor 1451. The touch sensor IC 1453 may control the touch sensor 1451 to sense a touch input or a hovering input with respect to a certain position on the display 1410. To achieve this, for example, the touch sensor 1451 may detect (e.g., measure) a change in a signal (e.g., a voltage, a quantity of light, a resistance, or a quantity of one or more electric charges) corresponding to the certain position on the display 1410. The touch circuitry 1450 may provide input information (e.g., a position, an area, a pressure, or a time) indicative of the touch input or the hovering input detected via the touch sensor 1451 to the processor 1320. According to an embodiment, at least part (e.g., the touch sensor IC 1453) of the touch circuitry 1450 may be formed as part of the display 1410 or the DDI 1430, or as part of another component (e.g., the auxiliary processor 1323) disposed outside the display module 1360.

According to an embodiment, the display module 1360 may further include at least one sensor (e.g., a fingerprint sensor, an iris sensor, a pressure sensor, or an illuminance sensor) of the sensor module 1376 or a control circuit for the at least one sensor. In such a case, the at least one sensor or the control circuit for the at least one sensor may be embedded in one portion of a component (e.g., the display 1410, the DDI 1430, or the touch circuitry 1450)) of the display module 1360. For example, when the sensor module 1376 embedded in the display module 1360 includes a biometric sensor (e.g., a fingerprint sensor), the biometric sensor may obtain biometric information (e.g., a fingerprint image) corresponding to a touch input received via a portion of the display 1410. For example, when the sensor module 1376 embedded in the display module 1360 includes a pressure sensor, the pressure sensor may obtain pressure information corresponding to a touch input received via a partial or whole area of the display 1410. According to an embodiment, the touch sensor 1451 or the sensor module 1376 may be disposed between pixels in a pixel layer of the display 1410, or over or under the pixel layer.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as “A or B,” “at least one of A and B,” “at least one of A or B,” “A, B, or C,” “at least one of A, B, and C,” “at least one of A, B, or C,", and "at least one of A, B, and/or C" may include any one of or all possible combinations of the items enumerated together in a corresponding one of the phrases. As used herein, such terms as "1st" and "2nd," or "first" and "second" may be used to simply distinguish a corresponding component from another, and do not limit the components in other aspects (e.g., importance or order). It is to be understood that if an element (e.g., a first element) is referred to, with or without the term "operatively" or "communicatively", as "coupled with," or "connected with" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1340) including one or more instructions that are stored in a storage medium (e.g., internal memory 1336 or external memory 1338) that is readable by a machine (e.g., the electronic device 1301). For example, a processor (e.g., the processor 1320) of the machine (e.g., the electronic device 1301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium, where the term "non-transitory" simply refers to the storage medium being a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The disclosure has been described with reference to the embodiments. It would be appreciated by those skilled in the art that changes may be made to these embodiments without departing from the principles and spirit of the disclosure. Therefore, the disclosed embodiments are provided for the purpose of describing the disclosure and the disclosure should not be construed as being limited to only the embodiments set forth herein. The scope of the disclosure is defined by the claims as opposed to by the above-mentioned descriptions, and it should be understood that disclosure includes all differences made within the equivalent scope. It will also be understood that any of the embodiment(s) described herein may be used in conjunction with any other embodiment(s) described herein.

What is claimed is:

1. An electronic device comprising:

at least one processor comprising processing circuitry;

memory comprising one or more storage media storing instructions;

display driver circuitry; and a display panel, wherein the instructions, when executed by the at least one processor, cause the electronic device to:

in response to obtaining a second image subsequent to a first image displayed on the display panel, identify a time length between a first timing at which a transmission of the first image to the display driver circuitry was started for the displaying of the first image and a second timing which is a start timing of a time period corresponding to a refresh rate for the second image;

based on the time length being longer than or equal to a reference length, display, on the display panel, using the display driver circuitry, the second image by executing multiple transmissions of the second image to the display driver circuitry within the time period from the second timing; and based on the time length being shorter than the reference length, display, on the display panel, using the display driver circuitry, the second image by executing a single transmission of the second image to the display driver circuitry within the time period from the second timing.

2. The electronic device of claim 1, wherein the first image is an image displayed on the display panel by executing one or more transmissions of the first image to the display driver circuitry within a time period corresponding to a refresh rate for the first image, and wherein the first timing is a start timing of an initial transmission of the first image from among the one or more transmissions of the first image.

3. The electronic device of claim 1, wherein the first image is an image displayed on the display panel by executing multiple transmissions of the first image to the display driver circuitry within a time period corresponding to a refresh rate for the first image, and wherein the first timing is a start timing of a last transmission of the first image from among the multiple transmissions of the first image.

4. The electronic device of claim 1, wherein each of the multiple transmissions of the second image is executed within another time period, corresponding to another refresh rate higher than the refresh rate, shorter than the time period, and wherein the single transmission of the second image is executed within the other time period.

5. The electronic device of claim 1, wherein identifying the time length, displaying the second image by executing the multiple transmissions of the second image, and displaying the second image by executing the single transmission of the second image are performed based on a video mode of display serial interface (DSI).

6. The electronic device of claim 1, wherein the number of the multiple transmissions of the second image executed based on the time length that is longer than or equal to another reference length is greater than the number of the multiple transmissions of the second image executed based on the time length that is longer than the reference length and is shorter than the other reference length, and wherein the other reference length is longer than the reference length.

7. The electronic device of claim 1, wherein the instructions, when executed by the at least one processor, cause the electronic device to:

while the second image is displayed on the display panel, identify an event indicating to change the refresh rate to another refresh rate higher than the refresh rate;

in response to obtaining a third image subsequent to the second image based on the event, identify another time length, wherein the other time length is between the second timing and a fourth timing or between a third timing and the fourth timing, wherein the third timing is a start timing of a last transmission of the second image from among the multiple transmissions of the second image, and wherein the fourth timing is a start timing of another time period corresponding to the other refresh rate;

based on the other time length being longer than the reference time length, display, on the display panel, using the display driver circuitry, the third image by executing multiple transmissions of the third image to the display driver circuitry within the other time period from the fourth timing; and based on the other time length being equal to or shorter than the reference time length, display, on the display panel, using the display driver circuitry, the third image by executing a single transmission of the third image to the display driver circuitry within the other time period from the fourth timing.

8. The electronic device of claim 1, wherein the refresh rate is a first refresh rate, and wherein the instructions, when executed by the at least one processor, cause the electronic device to:

while the second image is displayed on the display panel, identify an event indicating to change the refresh rate to a second refresh rate higher than the first refresh rate;

based on obtaining a third image subsequent to the second image according to the event, display, on the display panel, using the display driver circuitry, the third image by executing at least one transmission of the third image to the display driver circuitry based on the second refresh rate;

in response to identifying that displaying the third image by executing the at least one transmission of the third image based on the second image is maintained during a reference time, identify at least one fourth refresh rate to be used for changing the second refresh rate to a third refresh rate, wherein the at least one fourth refresh rate is between the second refresh rate and the third refresh rate, wherein the third refresh rate is the lowest refresh rate available in the electronic device;

maintain, on the display panel, using the display driver circuitry, displaying of the third image by executing at least one transmission of the third image to the display driver circuitry based on the at least one fourth refresh rate changed from the second refresh rate; and in response to identifying that displaying the third image by executing the at least one transmission of the third image based on the at least one fourth refresh rate is maintained during a reference time, maintain, on the display panel, using the display driver circuitry, displaying of the third image by executing at least one transmission of the third image to the display driver circuitry based on the third refresh rate changed from the at least one fourth refresh rate.

9. An electronic device comprising:

at least one processor comprising processing circuitry;

memory comprising one or more storage media storing instructions, display driver circuitry; and a display panel, wherein the instructions, when executed by the at least one processor, cause the electronic device to:

in response to obtaining a second image subsequent to a first image displayed on the display panel, identify a refresh rate for the second image;

based on the refresh rate being lower than a reference refresh rate, display, on the display panel, using the display driver circuitry, the second image by executing multiple transmissions of the second image to the display driver circuitry within a time period corresponding to the refresh rate; and based on the refresh rate being higher than the reference refresh rate, display, on the display panel, using the display driver circuitry, the second image by executing a single transmission of the second image to the display driver circuitry within the time period.

10. The electronic device of claim 9, wherein each of the multiple transmissions of the second image is executed in another time period, corresponding to another refresh rate higher than the refresh rate, shorter than the time period, and wherein the single transmission of the second image is executed within the other time period.

11. The electronic device of claim 10, wherein the other refresh rate is a maximum refresh rate usable in the electronic device.

12. The electronic device of claim 10, wherein identifying the refresh rate, displaying the second image by executing the multiple transmissions of the second image, and displaying the second image by executing the single transmission of the second image are performed based on a video mode of display serial interface (DSI).

13. The electronic device of claim 10, wherein the number of the multiple transmissions of the second image executed based on the refresh rate lower than another reference refresh rate lower than the reference refresh rate is greater than the number of the multiple transmissions of the second image executed based on the refresh rate lower than the reference refresh rate and higher than the other refresh rate.

14. The electronic device of claim 10, wherein the refresh rate is a first refresh rate, wherein the instructions, when executed by the at least one processor, cause the electronic device to:

while the second image is displayed on the display panel, identify an event indicating to change the first refresh rate to a second refresh rate higher than the first refresh rate;

based on obtaining a third image subsequent to the second image in accordance with the event, display, on the display panel, using the display driver circuitry, the third image by executing at least one transmission of the third image to the display driver circuitry based on the second refresh rate;

based on identifying that displaying the third image by executing the at least one transmission of the third image based on the second refresh rate, identify at least one fourth refresh rate, being between the second refresh rate and a third refresh rate, to be used for changing the second refresh rate to the third refresh rate, the third refresh rate being a minimum refresh rate available in the electronic device;

maintain, on the display panel, using the display driver circuitry, displaying of the third image executing at least one transmission of the third image to the display driver circuitry based on the at least one fourth refresh rate changed from the second refresh rate; and in response to identifying that displaying the third image by executing the at least one transmission of the third image based on the at least one fourth refresh rate is maintained during a reference time, maintain, on the display panel, using the display driver circuitry, displaying of the third image by executing at least one transmission of the third image to the display driver circuitry based on the third refresh rate changed from the at least one fourth refresh rate.

15. An electronic device comprising:

at least one processor comprising processing circuitry;

memory comprising one or more storage media storing instructions, display driver circuitry; and a display panel, wherein the instructions, when executed by the at least one processor, cause the electronic device to:

display, on the display panel, using the display driver circuitry, a first image by executing at least one transmission of the first image to the display driver circuitry based on a first refresh rate;

while the first image is displayed by executing the at least one transmission of the first image, identify whether a second image subsequent to the first image is obtained within a reference time period from a start timing of the displaying of the first image;

in response to identifying that the second image is obtained within the reference time period, display, on the display panel, using the display driver circuitry, the second image by executing at least one transmission of the second image to the display driver circuitry based on a second refresh rate for the second image; and in response to identifying that the second image is not obtained within the reference time period, display, on the display panel, maintain, on the display panel, using the display driver circuitry, displaying of the first image by executing at least one transmission of the first image to the display driver circuitry based on at least one fourth refresh rate, being between the first refresh rate and a third refresh rate, the third refresh rate being a minimum refresh rate available in the electronic device.

16. The electronic device of claim 15, wherein the instructions, when executed by the at least one processor, cause the electronic device to:

while the first image is displayed by executing the at least one transmission of the first image based on the at least one fourth refresh rate, identify whether the second image is obtained within another reference time period from an end timing of the reference time period;

in response to identifying that the second image is obtained within the other reference time period, display, on the display panel, the second image by executing at least one transmission of the second image to the display driver circuitry based on the second refresh rate of the second image; and in response to identifying that the second image is not obtained within the other reference time period, maintain, on the display panel, using the display driver circuitry, the first image by executing at least one transmission of the first image to the display driver circuitry based on the third refresh rate.

17. The electronic device of claim 15, wherein the instructions, when executed by the at least one processor, cause the electronic device to:

in response to identifying that the second image is not obtained within the reference time period, identify the at least one fourth refresh rate to change the first refresh rate to the third refresh rate; and maintain, on the display panel, using the display driver circuitry, the first image by executing the at least one transmission of the third image based on the at least one fourth refresh rate changed from the first refresh rate.

18. The electronic device of claim 15, wherein the at least one transmission of the first image executed based on the first refresh rate comprises:

on a condition that the first refresh rate is lower than the reference refresh rate, multiple transmissions of the first image executed within a time period corresponding to the first refresh rate, and on a condition that the first refresh rate is higher than the reference refresh rate, a single transmission of the first image executed within the time period.

19. The electronic device of claim 15, wherein the at least one transmission of the first image executed based on the first refresh rate comprises:

on a condition that a time length between a first timing at which a transmission of a third image, before the first image, to the display driver circuitry was started and a second timing being a start timing of a time period corresponding to the first refresh rate is longer than a reference length, multiple transmissions of the first image executed within a time period corresponding to the first refresh rate, and on a condition that the time length is shorter than the reference length, a single transmission of the first image executed within the period.

20. The electronic device of claim 15, wherein displaying the first image, displaying the second image, and maintaining displaying of the first image are performed based on a video mode of display serial interface (DSI).

* * * * *